United States Patent
Oliver

(10) Patent No.: US 12,442,071 B2
(45) Date of Patent: Oct. 14, 2025

(54) PLANETARY ROTATION SYSTEM WITH LUNAR ROTATION

(71) Applicant: Vacuum Innovations LLC, Dansville, NY (US)

(72) Inventor: James Oliver, Dansville, NY (US)

(73) Assignee: Vacuum Innovations LLC, Dansville, NY (US)

( * ) Notice: Subject to any disclaimer, the term of this patent is extended or adjusted under 35 U.S.C. 154(b) by 0 days.

(21) Appl. No.: 18/626,539

(22) Filed: Apr. 4, 2024

(65) Prior Publication Data

US 2024/0337010 A1 Oct. 10, 2024

Related U.S. Application Data

(60) Provisional application No. 63/494,613, filed on Apr. 6, 2023.

(51) Int. Cl.
| | |
|---|---|
| *C23C 14/50* | (2006.01) |
| *C23C 14/04* | (2006.01) |
| *C23C 14/24* | (2006.01) |
| *F16H 1/28* | (2006.01) |

(52) U.S. Cl.
CPC .......... *C23C 14/505* (2013.01); *C23C 14/042* (2013.01); *C23C 14/243* (2013.01); *F16H 1/28* (2013.01)

(58) Field of Classification Search
CPC ... C23C 14/505; C23C 14/042; C23C 14/243; F16H 1/28
See application file for complete search history.

(56) References Cited

U.S. PATENT DOCUMENTS

| | | | | |
|---|---|---|---|---|
| 4,805,348 | A * | 2/1989 | Arai | B24B 37/28 451/287 |
| 2013/0095973 | A1* | 4/2013 | Kroneberger | H01L 21/68792 475/149 |
| 2013/0136952 | A1* | 5/2013 | Yukimatsu | G01B 7/28 702/167 |
| 2022/0082165 | A1* | 3/2022 | Pollara, Jr. | F16H 1/32 |
| 2022/0299087 | A1* | 9/2022 | Kobayashi | F16H 57/021 |

OTHER PUBLICATIONS

Oliver, et al., Optimization of deposition uniformity for large-aperture National Ignition Facility substrates in a planetary rotation system,, Applied Optics, vol. 45, No. 13 May 1, 2006.

* cited by examiner

*Primary Examiner* — Edwin A Young
(74) *Attorney, Agent, or Firm* — Heslin Rothenberg Farley & Mesiti P.C.

(57) ABSTRACT

A planetary rotation system for coating includes a solar orbiter plate configured to rotate about a solar axis. A lunar rotation system is mounted to the solar orbiter plate. The lunar rotation system includes a lunar orbiter plate configured to rotate about a planetary axis. A plurality of lunar substrate holders is mounted on the lunar orbiter plate. Respective lunar substrate holders include a lunar axis extending centrally therethrough. The respective lunar axes are configured to rotate about the planetary axis. The respective ones of the lunar substrate holders are configured to rotate about their respective lunar axis and to hold a substrate for coating.

20 Claims, 15 Drawing Sheets

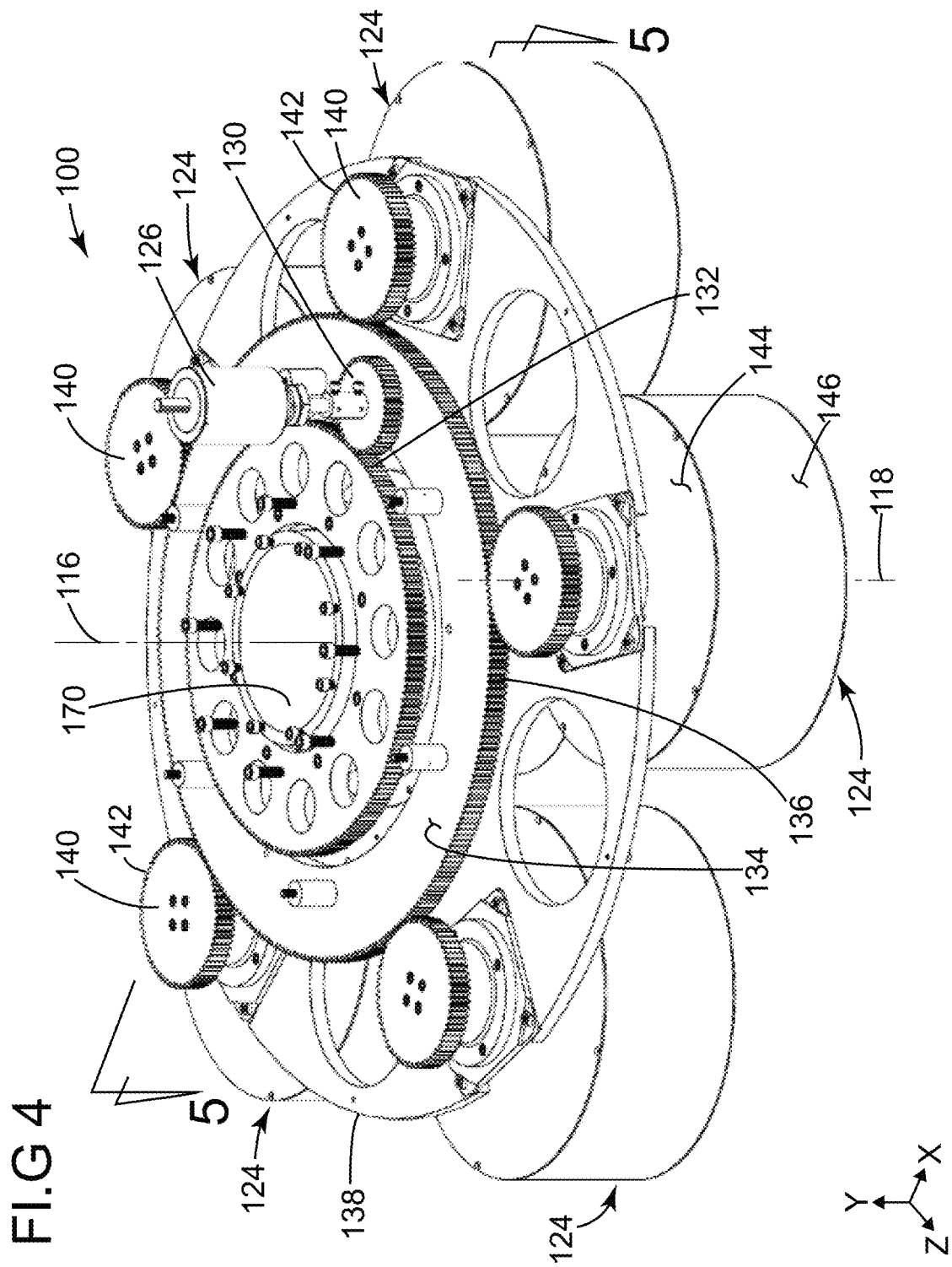

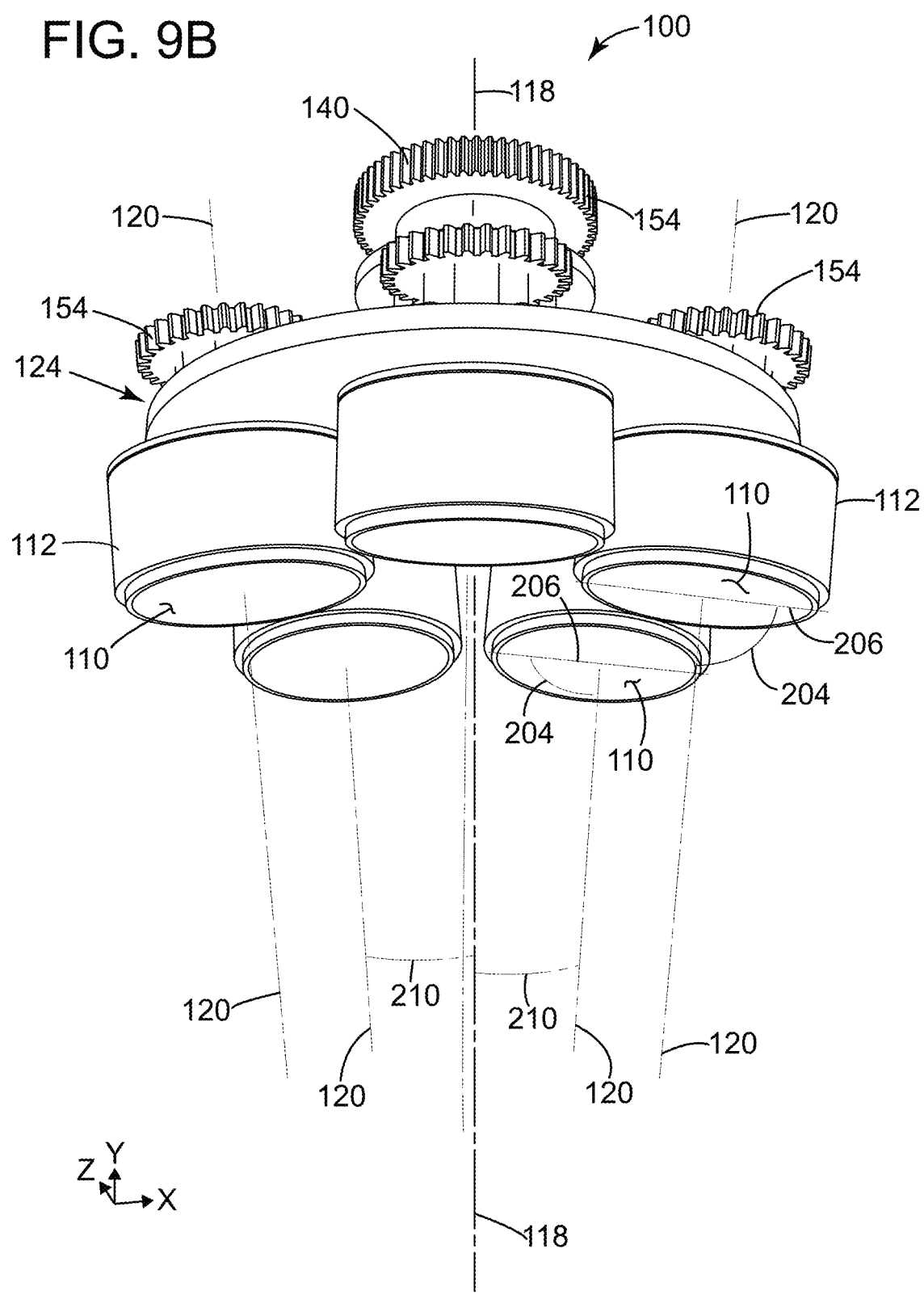

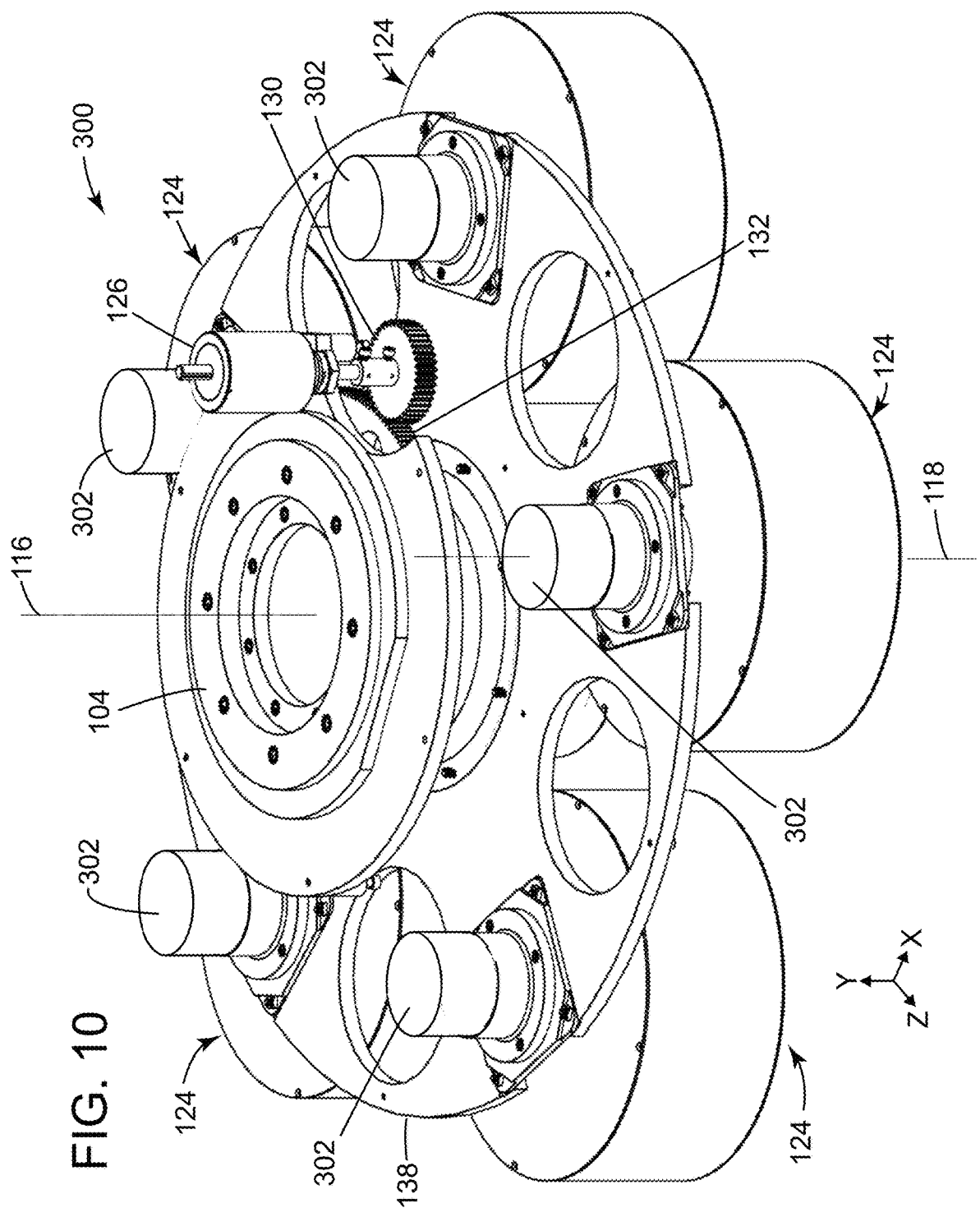

FIG. 12

From figure 11

↓

422 — Tilting the lunar axis at an acute angle relative to the planetary axis.

↓

424 — Coating a radially nonuniform and axially symmetric coating on the substrate.

↓

426 — Wherein the coating is a stress-compensation coating.

↓

428 — Wherein the coating is an asphere generation coating.

↓

430 — Wherein the coating is a radial group-delay compensation coating.

PLANETARY ROTATION SYSTEM WITH LUNAR ROTATION

CROSS REFERENCE TO RELATED APPLICATIONS

This application is a non-provisional application of, and claims the benefit of the filing date of, U.S. provisional application 63/494,613, filed Apr. 6, 2023, entitled "PLANETARY ROTATION SYSTEM WITH LUNAR ROTATION," the contents of which are incorporated herein by reference in their entirety.

TECHNICAL FIELD

The present disclosure relates to planetary rotation systems. More specifically, the disclosure relates to planetary rotation systems with lunar rotation sub-systems for coatings, such as, for example, physical vapor deposition coatings.

BACKGROUND

Dual axis rotation systems, often called planetary rotation systems have been used to hold substrates (such as lenses) in order to coat the substrates. Such planetary rotation systems are often mounted in a predetermined location of, for example, a vacuum chamber, directly above an evaporating boat containing material to be heated and vaporized in a vacuum within the chamber. The vaporized material ejects upward in a conical spray pattern to coat the substrates.

BRIEF DESCRIPTION

The present disclosure offers advantages and alternatives over the prior art by providing a planetary rotation system for coating having one or more lunar rotation systems. The planetary rotation system includes a solar axis and one or more planetary axes. Advantageously however, respective planetary axes also include one or more lunar rotation systems having a plurality of third axes (herein "lunar" axes), which pass centrally through a lunar substrate holder containing a substrate. The respective lunar axes rotate about their associated planetary axes, much like a moon orbiting a planet. Additionally, respective substrates may spin about the respective lunar axes as the lunar axes orbit about the planetary axis.

The additional lunar axes enable greater capacity of axially symmetric coatings on numerous small-to-mid sized optics than a dual axis planetary rotation system can provide. Additionally, the optic center of respective substrates, having a lunar axis passing therethrough, may not be stationary with respect to its mask. Accordingly, the substrates may be accurately masked such that the deposition of vaporized materials on their optic centers may not be limited to 0 percent or 100 percent of the maximum thickness of the vaporized materials deposited on the substrate.

A planetary rotation system for coating in accordance with one or more aspects of the present disclosure includes a solar orbiter plate configured to rotate about a solar axis. A lunar rotation system can be mounted to the solar orbiter plate. The lunar rotation system includes a lunar orbiter plate configured to rotate about a planetary axis. A plurality of lunar substrate holders can be mounted on the lunar orbiter plate. The respective lunar substrate holders have a lunar axis extending centrally therethrough. The respective lunar axes can be configured to rotate about the planetary axis. The respective lunar substrate holders can be configured to rotate about their lunar axis and to hold a substrate for coating.

Another planetary rotation system for coating in accordance with one or more aspects of the present disclosure includes a solar gear having solar gear teeth and a solar axis extending centrally therethrough. The solar gear is configured to be positioned stationarily relative to the solar axis. A solar orbiter plate is configured to rotate about the solar axis. A plurality of planet gears include planet gear teeth and a planetary axis extending centrally therethrough. The respective planet gears are mounted on the solar orbiter plate such that the planet gear teeth of the respective planet gears mesh with the solar gear teeth to rotate the respective planet gears about their respective planetary axes. Respective ones of a plurality of lunar rotation systems are mounted to respective ones of the planet gears. The respective lunar rotation systems include a lunar orbiter plate configured to rotate about a respective one of the planetary axes. A plurality of lunar substrate holders of the lunar rotation system are mounted on the lunar orbiter plate. Respective ones of the lunar substrate holders include a lunar axis extending centrally therethrough. The respective lunar axes are configured to rotate about the planetary axis. The respective lunar substrate holders are configured to rotate about their respective lunar axis and to hold a substrate for coating.

Another planetary rotation system for coating in accordance with one or more aspects of the present disclosure includes a solar axis about which the planetary rotation system is configured to rotate. A lunar rotation system is configured to rotate about a planetary axis passing centrally therethrough. The planetary axis is different from the solar axis. The lunar rotation system includes a lunar substrate holder configured to hold a substrate. A lunar axis passing centrally through the lunar substrate holder. The lunar axis is different from the solar axis and the planetary axis.

A method of coating a substrate in accordance with one or more aspects of the present disclosure includes rotating a lunar rotation system about a solar axis of a planetary rotation system. The lunar rotation system is rotated about a planetary axis different from the solar axis. A lunar substrate holder mounted to the lunar rotation system is rotated about a lunar axis different from the planetary axis and the solar axis. A substrate mounted to the lunar substrate holder is coated.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits and advantages described herein.

DRAWINGS

The disclosure will be more fully understood from the following detailed description taken in conjunction with the accompanying drawings, in which:

FIG. 4 depicts a top perspective view of the planetary rotation system of FIG. 2A, with its mounting plate removed, according to aspects described herein;

FIG. 9B depicts a perspective side view of the lunar rotation system 124 of FIG. 8, having each respective lunar axis tilted inward at an acute angle relative to the planetary axis, according to aspects described herein;

FIG. 10 depicts a top perspective view of another embodiment of a planetary rotation system, wherein each respective lunar rotation system is driven by an independent drive motor, according to aspects described herein;

FIG. 12 depicts a flow diagram of a continuation of the method of FIG. 11 of coating a substrate, according to aspects described herein.

DETAILED DESCRIPTION

Figure 1:
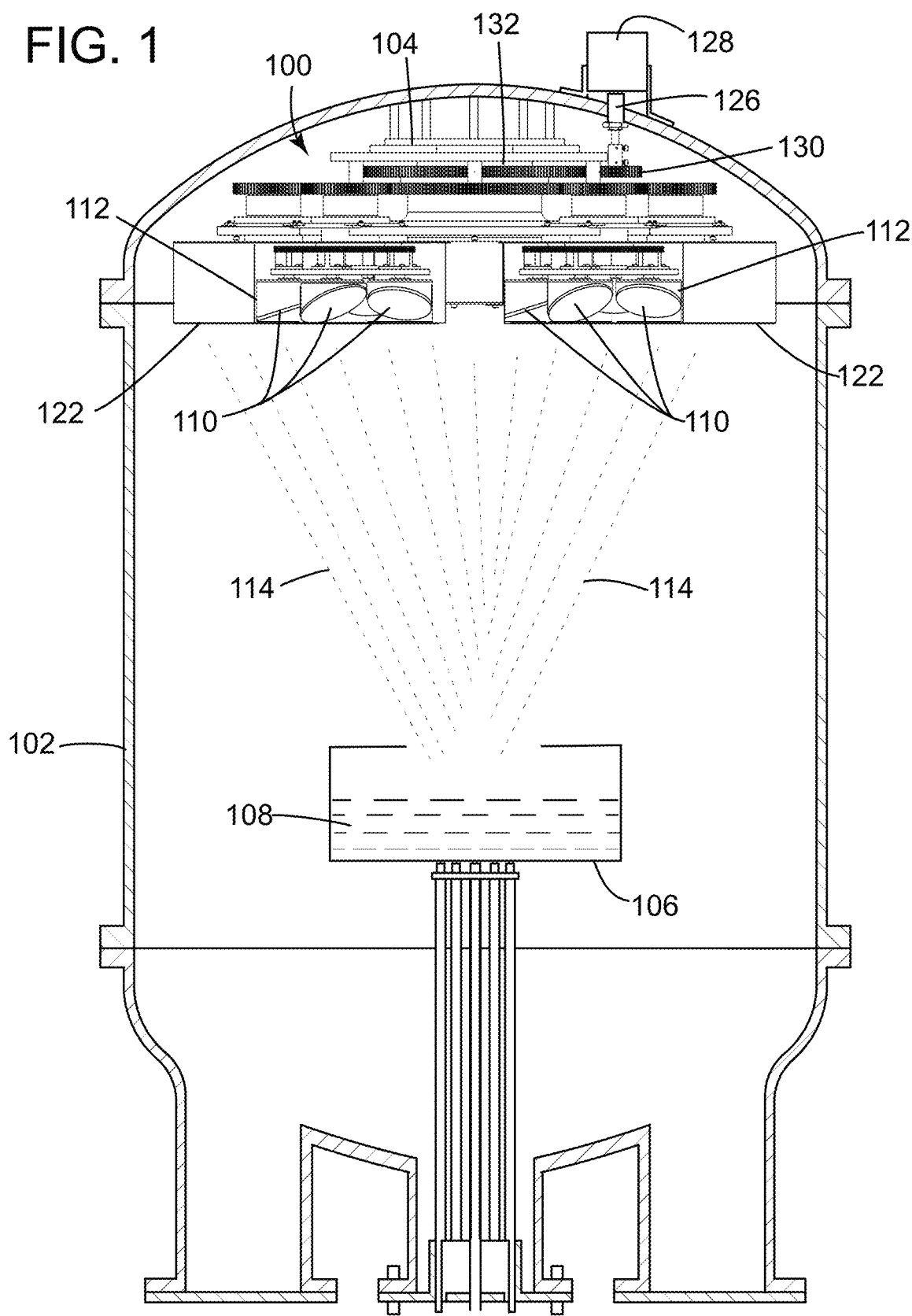
FIG. 1 depicts a cross sectional perspective view of a vacuum chamber having a planetary rotation system mounted therein, according to aspects described herein.

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example may be combined with the features of other examples. Such modifications and variations are intended to be included within the scope of the present disclosure.

The terms "significantly", "substantially", "approximately", "about", "relatively," or other such similar terms that may be used throughout this disclosure, including the claims, are used to describe and account for small fluctuations, such as due to tolerances or variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Embodiments herein recognize that substrates are mounted on substrate holders of a planetary rotation system, wherein the substrate holders orbit around a central first axis, which may often be called a solar axis, much like planets orbing a sun. Each respective lunar substrate holder of the planetary rotation system has a second axis, often called a planetary axis, which extends centrally through each respective holder. The holders rotate about their associated planetary axis, much like a planet rotates on its axis. The dual axis rotation of the substrates about the solar and planetary axes can be used to help provide a more even deposition of coating material on the substrates, which may often have complex curved geometric surfaces to be coated.

Embodiments herein also recognize that coating systems can benefit from more axially symmetric coatings on numerous small-to-mid sized optics that a dual axis planetary rotation system has trouble meeting. Additionally, embodiments herein recognize that coating systems can benefit from a substrate mounting system which enables each respective substrate to maintain an axially symmetric film distribution while allowing for the integration of precision uniformity masking. Moreover, embodiments herein recognize that coating systems can benefit from a substrate mounting system which includes a precision uniformity masking system, wherein the center of the substrate to be masked is not stationary with respect to the mask and the center of the substrate is not limited to just 0 percent or 100 percent Accordingly, the substrates may be accurately masked such that the deposition of vaporized materials on their optic centers may not be limited to 0 percent or 100 percent of the maximum thickness of the vaporized materials deposited on the substrate.

Referring to FIG. 1, an example of a cross sectional perspective view of a planetary rotation system 100 mounted within a vacuum chamber 102 is depicted, according to aspects described herein. The planetary rotation system 100 includes a mounting plate 104 which can be rigidly attached, such as by bolting, to a predetermined upper location of the vacuum chamber 102.

An evaporating boat 106, or some other appropriate material holding device, can be placed in a predetermined location of the vacuum chamber 102, below the planetary rotation system 100. Source material 108 to be evaporated can be placed in the evaporating boat 106. Substrates 110, such as lenses, are mounted in lunar substrate holders 112 and are oriented such that the surfaces of the substrates 110 to be coated face towards the source material 108 from which evaporating material 114 can be to be evaporated and deposited on the substrates 110.

A vacuum can be pulled in the vacuum chamber 102 and the source material 108 can be heated in a suitable manner such as by resistance heating, induction heating or electron bombardment to emit the evaporating material 114. The evaporating material 114 passes in relatively straight lines from the source material 108 to coat the substrates 110 contained in the lunar substrate holders 112.

As will be discussed in greater detail herein, the planetary rotation system 100 includes three axes of rotation, i.e., a solar axis 116, a planetary axis 118 and a lunar axis 120 (see FIG. 3A), about which the lunar substrate holders 112 and their substrates 110 may rotate or spin. The capability of rotating about three axes during the deposition process enables coatings that are more axially uniform than systems that only use two axes. Additionally, the centers of the substrates 110 do not have to be stationary relative to any mask (such as lunar masks 122) that are placed under the substrate 110.

The planetary rotation system 100 incudes rotary feedthrough 126, which feeds through the vacuum chamber and engages with an external drive motor 128 that may be rigidly mounted to the top exterior of the vacuum chamber 102. The rotary feedthrough 126 turns a drive gear 130, which engages with and drives a driven gear 132. The external drive motor 128, rotary feedthrough 126, drive gear 130 and driven gear 132 provide a drive mechanism for the planetary rotation system 100.

Alternatively, the rotary feedthrough 126 could be replaced by an internal drive motor (not shown) that can be rigidly mounted to the top interior of the vacuum chamber 102. The internal drive motor may be directly connected to the drive gear 130 to provide the motive force to drive the driven gear 132.

The example in FIG. 1 illustrates a planetary rotation system 100 being used in an evaporative coating process. However, it is within the scope of this disclosure to use such planetary rotations systems in accordance with aspects described herein with other types of coating processes as well. For example, aspects of the planetary rotation system 100 may be used in any type of physical vapor deposition coating process, such as a sputtering process. By way of other examples, aspects of the planetary rotation system 100 may be used in magnetron sputtering processes, ion beam sputtering processes, pulsed laser deposition processes, cathodic arc deposition processes or the like.

Moreover, the planetary rotation system 100 illustrated in the example of FIG. 1 can be often used to provide an optical coating on the substrates, wherein the substrates are lenses. However planetary rotation systems in accordance with aspects described herein may be used to provide other types of coatings, such as, for example, protective coatings, decorative coatings, coatings for electronics/semiconductor applications, or the like.

Also, the example in FIG. 1 illustrates a vertical deposition process. However, the planetary rotation systems in accordance with aspects described herein may also be used in a horizontal deposition process, such as in many types of sputtering processes.

Figure 2A:
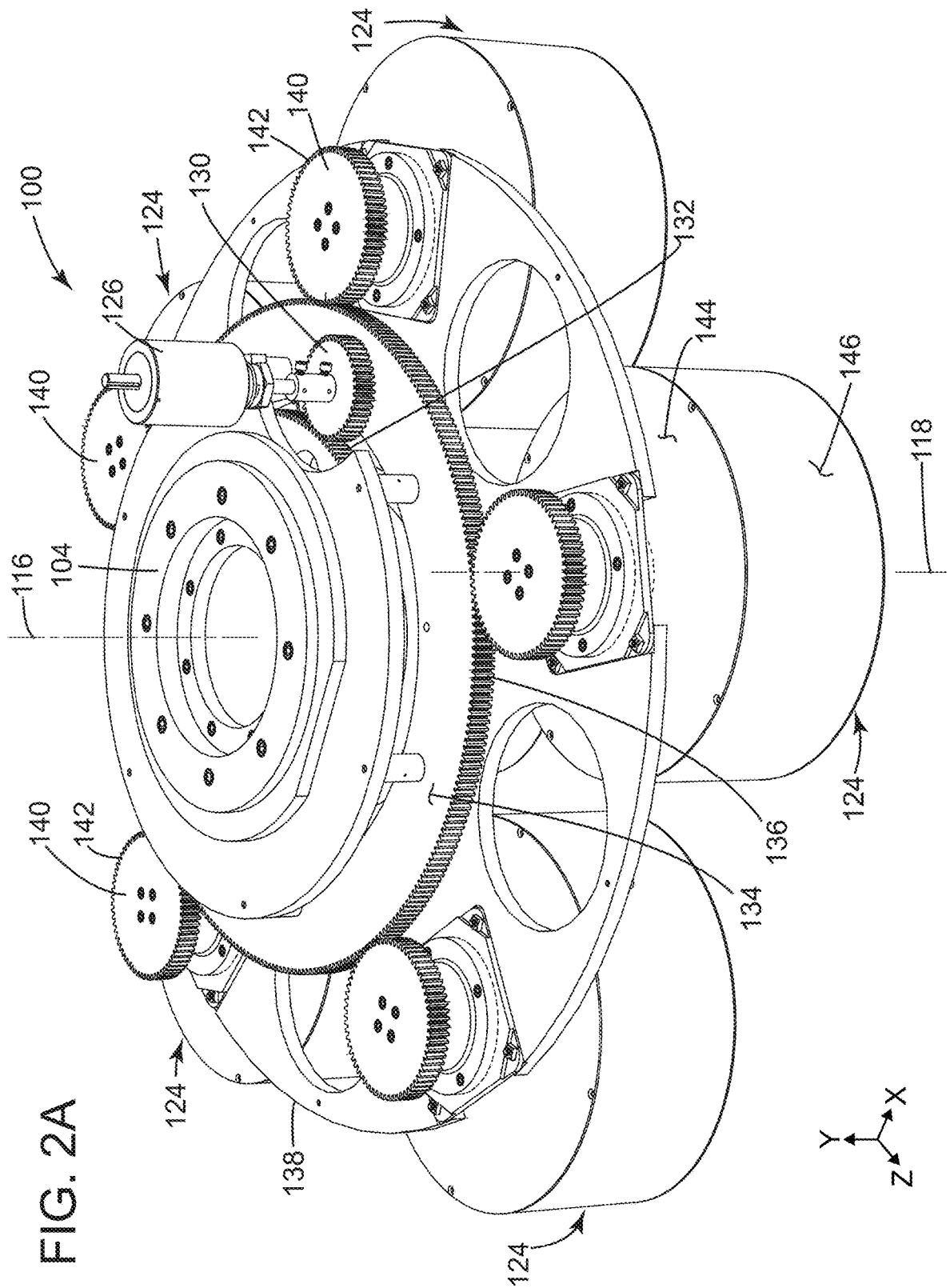
FIG. 2A depicts a top perspective view of a planetary rotation system with a plurality of lunar rotation systems, according to aspects described herein.

Referring to FIG. 2A, a top perspective view of a planetary rotation system 100 with a plurality of lunar rotation systems 124 is depicted, according to aspects described herein. The planetary rotation system 100 also includes a solar gear 134 having solar gear teeth 136 and a solar axis 116. The solar gear 134 can be configured to be positioned stationarily relative to the solar axis 116. The planetary rotation system 100 also includes a solar orbiter plate 138 that can be configured to rotate about the solar axis (see FIG. 3B). One or more planet gears 140 having planet gear teeth 142 and a planetary axis 118 are also included in the planetary rotation system 100. The planet gears 140 are mounted on the solar orbiter plate 138 such that the planet gear teeth 142 mesh with the solar gear teeth 136 of the solar gear 134 to rotate the planet gears 140 about the planetary axis 118 of each respective planet gear 140.

The lunar rotation systems 124 of the planetary rotation system 100 are each enclosed by a top lunar mask plate 144 and a cylindrical lunar mask wall 146, which extends downward from the lunar mask plate 144. A lunar mask 122 (see FIG. 3B) can be mounted to the lower distal ends of the lunar mask walls 146.

Figure 2B:
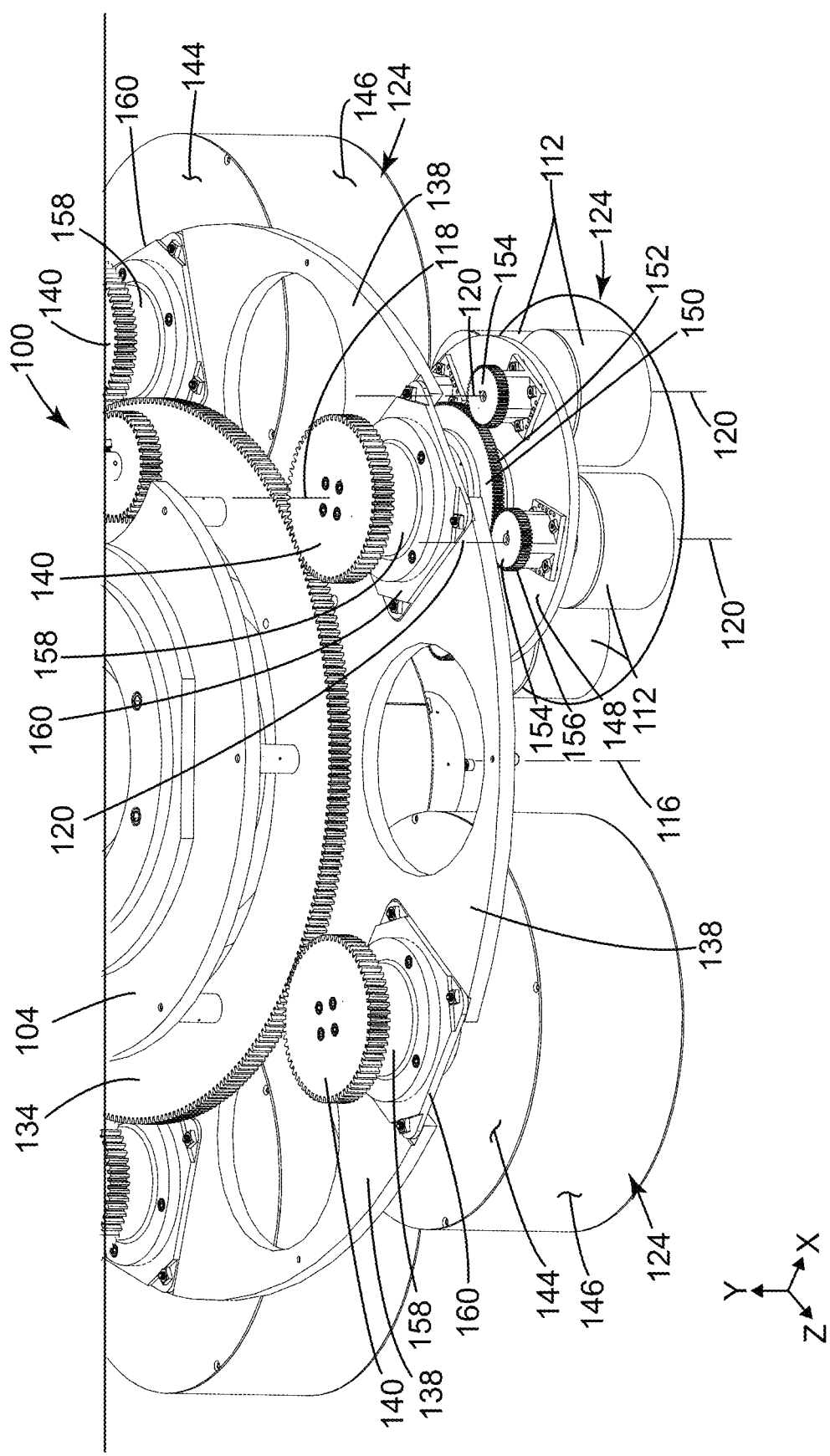
FIG. 2B depicts an enlarged perspective view of a lunar rotation system of the planetary rotation system of FIG. 2A, with the lunar mask plate and lunar mask wall removed, according to aspects described herein.

Referring to FIG. 2B, an enlarged perspective view of a lunar rotation system 124 of the planetary rotation system 100, with the lunar mask plate 144 and lunar mask wall 146 removed is depicted. Each respective lunar rotation system 124 can be mounted to a planet gear 140. Each respective planet gear 140 can be rotationally assembled to an outer planet hub 158 that can be rigidly attached to an adapter plate 160. Each respective adapter plate 160 can be rigidly mounted to the solar orbiter plate 138.

Each respective lunar rotation system 124 includes a lunar orbiter plate 148, which can be configured to rotate about the planetary axis 118. Each respective lunar rotation system 124 also includes a plurality of lunar substrate holders 112 mounted on the lunar orbiter plate 148. Each respective lunar substrate holder 112 has a lunar axis 120 extending centrally therethrough. Each respective lunar axis 120 can be configured to rotate about the planetary axis 118 (see FIG. 3B). Each respective lunar substrate holder 112 can be configured to hold a substrate 110 (see FIG. 8) for coating.

The lunar mask 122 can be positioned under the lunar substrate holders 112 of each respective lunar rotation system 124. The lunar mask 122 can be held in place by the lunar mask wall 146 and lunar mask plate 144. The lunar mask plate 144 can be rigidly attached to a lower portion of the outer planet hub 158.

The lunar rotation system 124 also includes a lunar orbiter gear 150 having lunar orbiter gear teeth 152. The lunar orbiter gear 150 can be configured to be positioned stationarily relative to the planetary axis 118.

A plurality of lunar gears 154, each having lunar gear teeth 156, are mounted to the lunar orbiter plate 148. One of each respective lunar gear 154 can be attached to one of each respective lunar substrate holder 112 and has one of each respective lunar axis 120 extending centrally therethrough. Each respective lunar gear 154 can be mounted on the lunar orbiter plate 148 such that the lunar gear teeth 156 of each respective lunar gear 154 mesh with the lunar orbiter gear teeth 152 of the lunar orbiter gear 150 to rotate each respective lunar gear 154 and its attached lunar substrate holder 112 about each associated lunar axis 120.

Figure 3A:
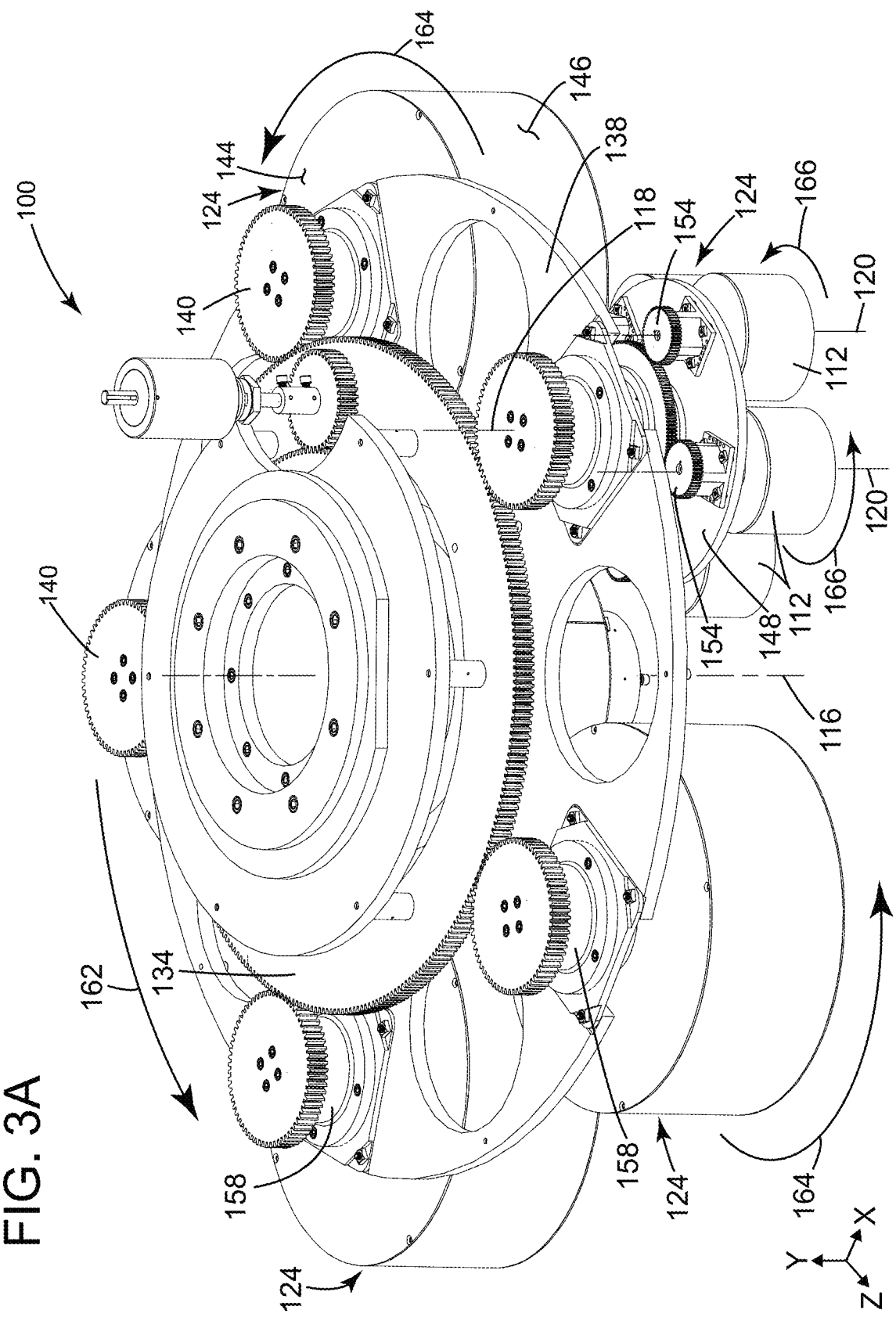
FIG. 3A depicts a top perspective view of the planetary rotation system of FIG. 2A, showing the solar axis, planetary axes and lunar axes about which the substrates rotate, according to aspects described herein.

Referring to FIG. 3A a top perspective view of the planetary rotation system 100, showing the solar axis 116, the planetary axes 118 and the lunar axes 120 about which the substrates 110 rotate is depicted, according to aspects described herein.

As described earlier herein, the one or more lunar rotation systems 124 include a lunar mask plate 144 fixedly attached to the solar orbiter plate 138 via the outer planet hub 158. The lunar mask wall 146 can be fixedly attached to, and extending downward from, the lunar mask plate 144. The lunar mask wall 146 surrounds the plurality of lunar substrate holders 112.

As can be seen in FIG. 3A, the solar axis 116 extends centrally through the solar orbiter plate 138 and solar gear 134, around which (as indicated by directional solar arrow 162) the planet gears 140 rotate or orbit. The planetary axes 118 extend centrally through each of their associated planet gears 140. As the planet gears 140 orbit the solar axis, they each rotate or spin (as indicated by directional planetary arrows 164) about their own planetary axis 118.

Simultaneously, within each respective lunar rotation system 124, the lunar gears 154 rotate or orbit about their associated planetary axis 118. The lunar axes 120 extend centrally through each of their associated lunar gears 154. As the lunar gears 154 orbit their associated planetary axis 118, they each rotate or spin (as indicated by directional lunar arrows 166) about their own lunar axis 120.

Figure 3B:
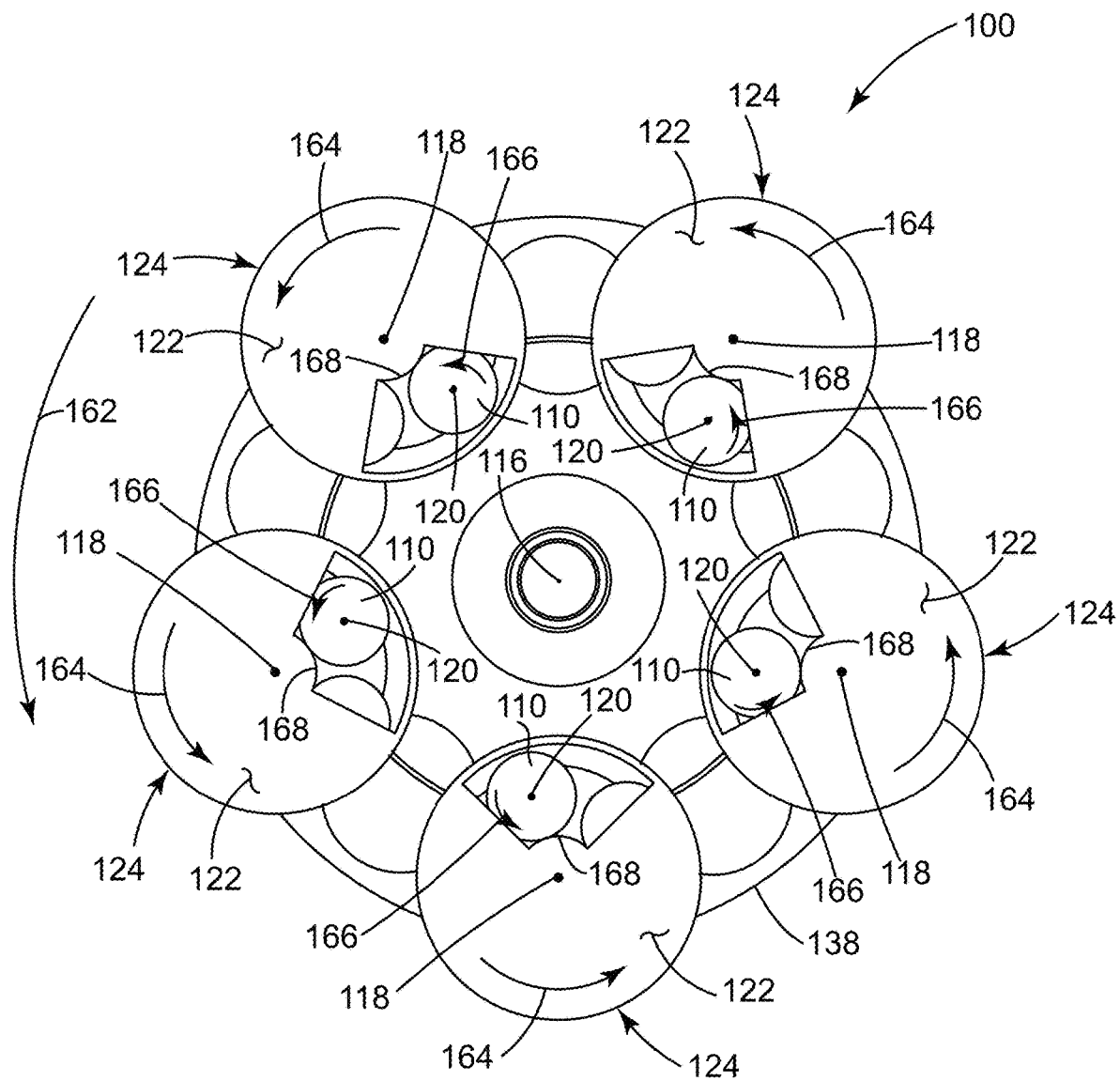
FIG. 3B depicts a bottom view of the planetary rotation system of FIG. 2A, showing the solar axis, planetary axes and lunar axes about which the substrates rotate, according to aspects described herein.

Referring to FIG. 3B, a bottom view of the planetary rotation system 100, showing the solar axis 116, the planetary axes 118 and the lunar axes 120 about which the substrates 110 rotate is depicted, according to aspects described herein.

Each respective lunar mask 122 can be fixedly attached to a bottom portion of the lunar mask wall 146. Each respective lunar mask 122 has a lunar mask opening 168 disposed therethrough. At least a portion of each respective substrate 110 held by each respective lunar substrate holder 112 rotates over the lunar mask opening 168 as each of the respective lunar substrate holders 112 rotate about the planetary axis 118.

In other words, the lunar mask opening 168 may be positioned so that only a portion of the substrate 110 gets exposed to the evaporating material 114 (see FIG. 1) as it passes over the lunar mask opening 168. Advantageously, the center of the substrate 110 may not be stationary with respect to the lunar mask opening. Additionally, center of the substrate 110 may pass over the mask opening 168. Therefore, the substrates 110 may be accurately masked such that the deposition of vaporized materials on their centers may not be limited to 0 percent or 100 percent of the maximum thickness of the vaporized materials deposited on the substrate. Rather, the percentage of maximum thickness of vaporized materials at the center of the substrates 110 may be 0 percent, 100 percent, or any percentage in between, such as, for example, 20 percent, 40 percent 50 percent, 75 percent or any other percentage between 0 and 100 percent.

The ability to coat the center of the substrate 110 to a thickness between 0 and 100 percent of the maximum thickness of the vaporized materials is advantageous. This is because many substrates 110 have to be coated at a percentage of maximum thickness other than 0 or 100 percent for optimal performance.

By contrast, in previous two-axis planetary rotation systems, the substrates would orbit a solar axis and would also rotate about a planetary axis, much like a planet rotates on its axis as the planet orbits the sun. A mask, having a mask opening, may be mounted under the substrate, directly to the planetary rotation system similarly to the way the lunar mask 122 is mounted to the lunar rotation system 124 in the three-axis planetary rotation system 100 of the present disclosure. However, in this configuration the planetary axis would pass through the centers of both the substrate and the mask of the two-axis system. Accordingly, the center of the substrate would be stationary with respect to the center of the mask and mask opening. As such the substrate center would be limited to only being coated a 0 percent of the maximum coating thickness when the mask opening does not expose the center, or 100 percent of the maximum coating thickness when the mask opening exposes the center for the entire deposition process.

Also, by way of contrast, it is possible to mount a mask, having a mask opening, to the walls of the vacuum chamber 102 in which a two-axis planetary rotation system is placed. In this configuration, the center of the substrate would not be stationary relative to the mask. However, the factors that contribute to unwanted tolerances for positioning the mask relative to the moving substrates would disadvantageously grow, which would negatively affect the tolerances of the desired coating profiles on the substrates. Such factors would include, for example, the tolerances of positioning the mask to the walls of the vacuum chamber, plus the tolerances for positioning the planetary rotation system to the walls of the vacuum chamber, both of which would be eliminated if the mask were mounted directly to the planetary rotation system.

Accordingly, in a two-axis system, mounting the mask to the walls of the vacuum chamber may enable the centers of the substrates to move relative to the mask. However, such a configuration would come at the sacrifice of the precision with which the coating profiles can be deposited onto the substrate.

As can be readily seen in FIG. 3B, the solar axis 116 passes through the center of the entire planetary rotation system 100, wherein the planet gears 140 (see FIG. 3A) and lunar rotation systems 124 orbit or rotate (as indicated by directional solar arrow 162) around the solar axis 116. Additionally, the planetary axes 118 pass through the center of each respective planet gear 140 (see FIG. 3A) and associated lunar rotation system 124, wherein the planet gears 140 and lunar rotation systems 124 rotate or spin (as indicated by directional planetary arrows 164) about the planetary axes 118.

Finally, the lunar axes 120 pass through the center of each respective lunar gear 154 (see FIG. 3A), lunar substrate holder 112 (see FIG. 3A) and attached substrate 110. Each respective lunar gear 154, lunar substrate holder 112 and attached substrate 110 may rotate or spin (as indicated by directional lunar arrows 166) about their associated lunar axis 120.

Note that directional arrows 162, 164, and 166 are all illustrated herein as rotating in a counterclockwise direction around the solar axis 116, planetary axis 118 and lunar axis 120 respectively. However, it is within the scope of this disclosure that the direction of rotation around each respective axis 116, 118 and 120 may be in the clockwise direction as well. Further the direction of rotation around the axes 116, 118 and 120 does not have to all be in the same direction.

Referring to FIG. 4, a top perspective view of the planetary rotation system 100, with its mounting plate 104 removed is depicted, according to aspects described herein. The driven gear 132 can be mounted concentrically around an inner center hub 170, such that the driven gear 132 may rotate around the inner center hub 170 wherein it can be driven by the drive gear 130. The inner center hub 170 can be configured to be positioned stationarily relative to the solar axis 116. In this case, the inner center hub 170 can be bolted to the mounting plate 104, which can be rigidly affixed to the top of the vacuum chamber 102 (see FIG. 1).

Figure 5:
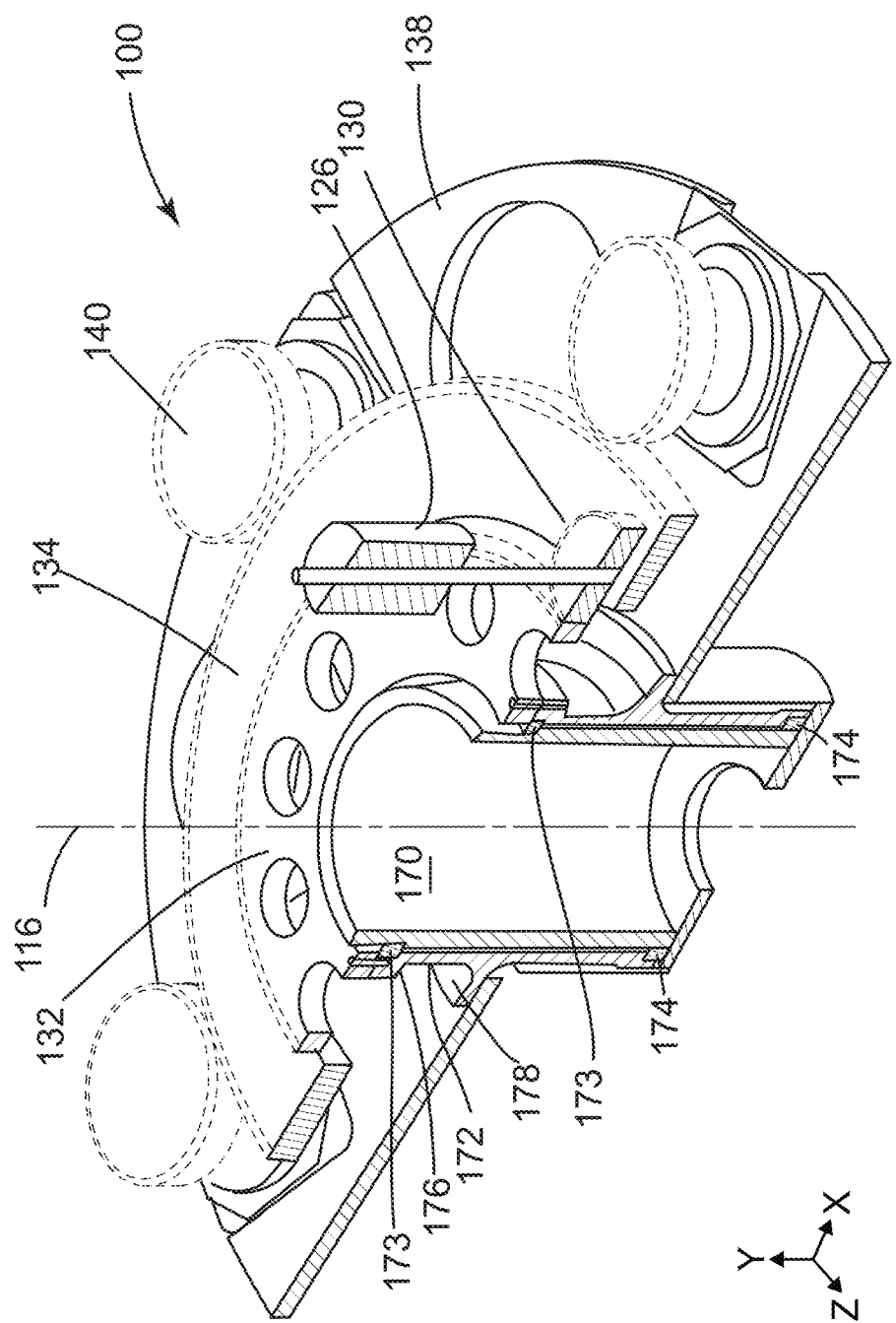
FIG. 5 depicts a cross sectional perspective view of FIG. 4 taken along the line 5-5 in FIG. 4, with the lunar rotation system removed, according to aspects described herein.

Referring to FIG. 5, a cross sectional perspective view of FIG. 4 taken along the line 5-5 in FIG. 4, with the lunar rotations systems 124 removed is depicted, according to aspects described herein. The planetary rotation 100 also includes an outer center hub 172 concentrically disposed over the inner center hub 170. A first solar bearing 173 and a second solar bearing 174 are disposed between the inner center hub 170 and outer center hub 172. The first and second solar bearings 173, 174 are configured to enable the outer center hub 172 to rotate about the solar axis 116 while the inner center hub 170 remains stationary relative to the solar axis 116.

The driven gear 132 can be bolted to an upper flange 176 of the outer center hub 172. Therefore, when the drive gear 130 drives the driven gear 132, the driven gear 132 rotates the outer center hub 172 about the stationary inner center hub 170.

The solar orbiter plate 138 can be attached to the outer center hub 172 to enable the solar orbiter plate 138 to rotate about the solar axis 116. More specifically, in this case, the solar orbiter plate 138 can be rigidly bolted to a lower flange 178 of the outer center hub 172. Therefore, as the outer center hub 176 rotates about the solar axis 116, the solar orbiter plate 138 and its attached planet gears 140, also rotate about the solar axis 116.

Figure 6:
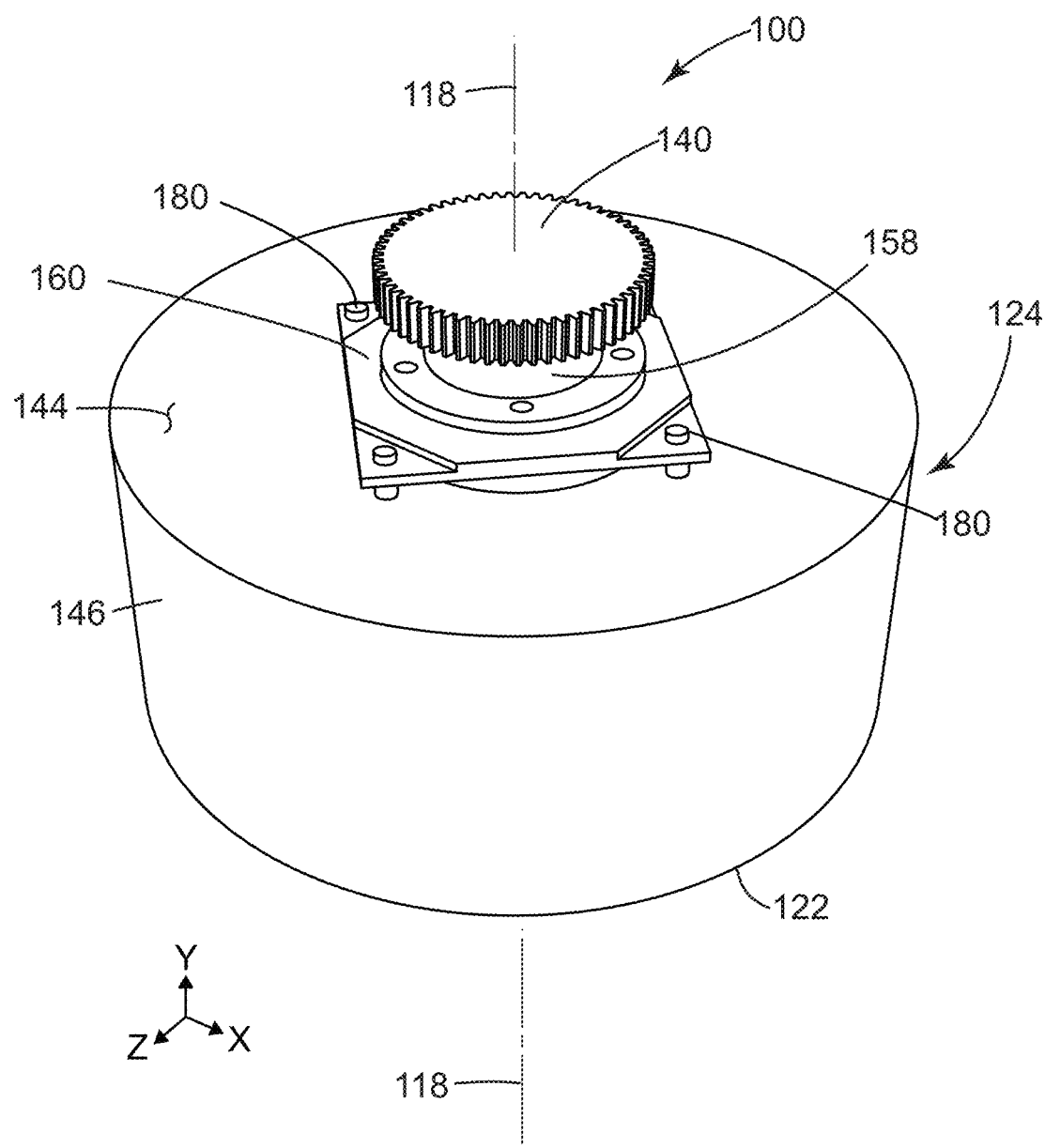
FIG. 6 depicts an enlarged top perspective view of the lunar rotation system of FIG. 2A, according to aspects described herein.

Referring to FIG. 6, an enlarged top perspective view of a lunar rotation system 124 of the planetary rotation system 100 is depicted, according to aspects described herein. As illustrated, the associated planet gear 140 of the lunar rotation system 124 can be rotationally mounted to the outer planet hub 158, which can be rigidly attached to the adapter plate 160. The adapter plate 160 can be bolted to the solar orbiter plate 138 (see FIG. 2B) and additionally bolted to the lunar mask plate 144 via bolts 180. The lunar mask plate 144 can be affixed to the lunar mask wall 146 and the lunar mask 122 can be mounted to the lower distal end of the lunar mask wall 146 via bolts.

Figure 7:
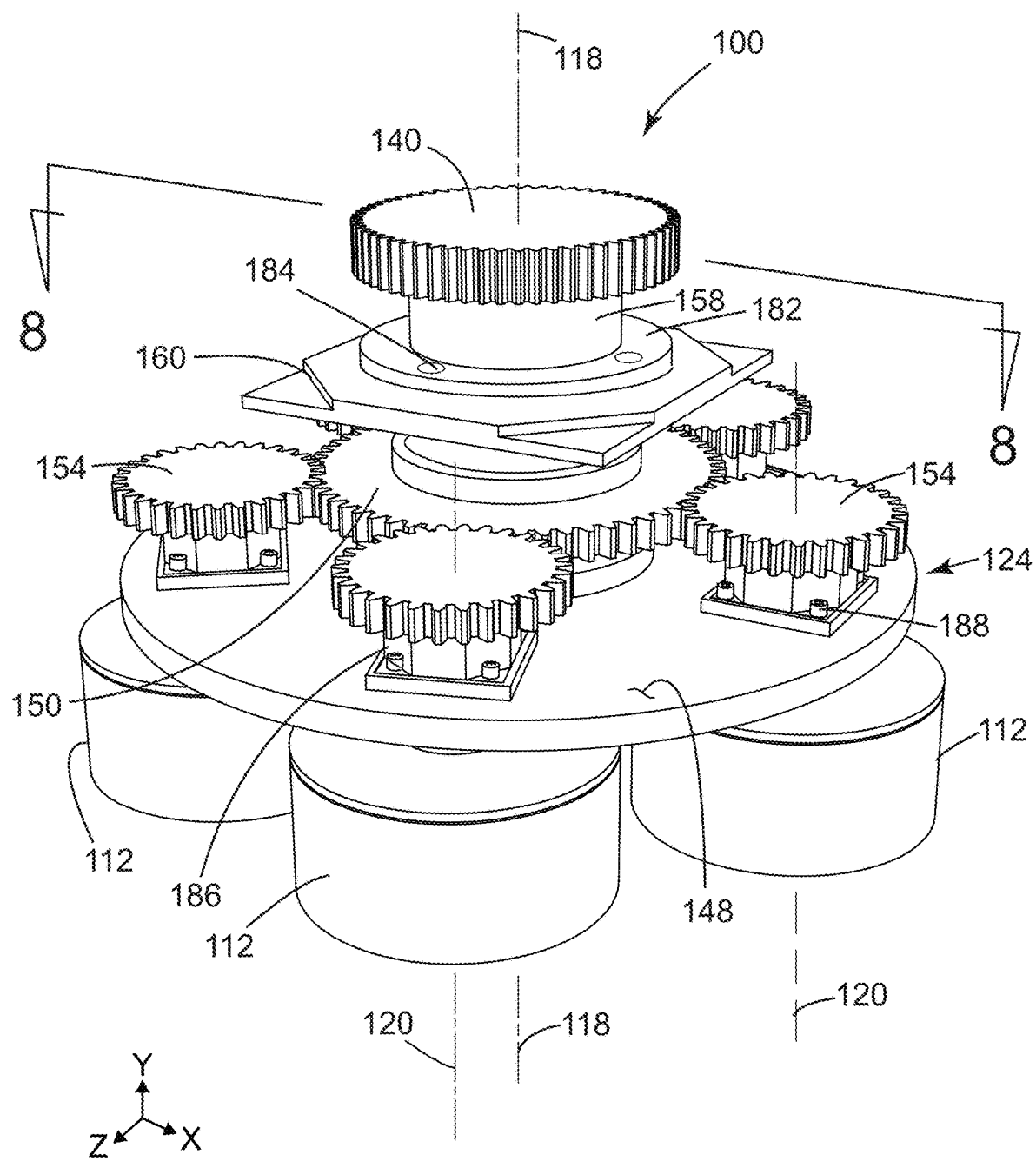
FIG. 7 depicts a top perspective view of the lunar rotation system of FIG. 6, with the lunar mask wall, lunar mask plate and lunar mask removed, according to aspects described herein.

Referring to FIG. 7, a top perspective view of the lunar rotation system 124 of FIG. 6, with the lunar mask wall 146, lunar mask plate 144 and lunar mask 122 removed is depicted, according to aspects described herein. The adapter plate 160 can be bolted to a mid-level flange 182 of the outer planet hub 158 via bolts 184 to rigidly attach the outer planet hub 158 to the adapter plate 160. The outer planet hub 158 can be rigidly attached to the lunar orbiter gear 150 such that the lunar orbiter gear 150 remains stationary relative to the planetary axis 118 as the planet gear 140 rotates about the planetary axis 118.

The lunar gears 154 are rotationally assembled to an outer lunar hub 186. Each respective outer lunar hub 186 can be bolted to the lunar orbiter plate 148 via bolts 188.

Figure 8:
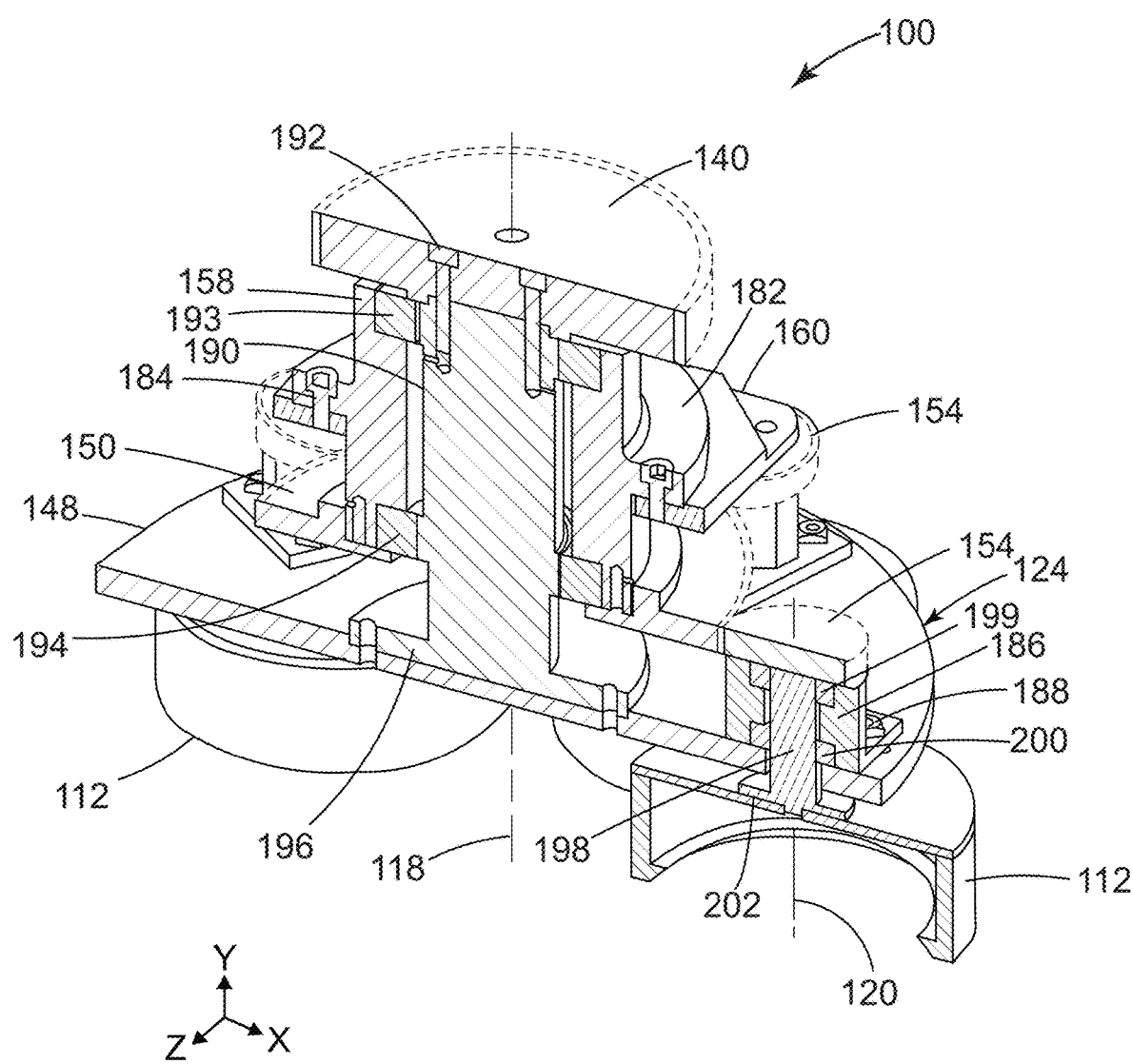
FIG. 8 depicts a cross sectional perspective view of the lunar rotation system of FIG. 7 taken along the line 8-8 in FIG. 7, according to aspects described herein.

Referring to FIG. 8, a cross sectional perspective view of the lunar rotation system 124 of FIG. 7 taken along the line 8-8 in FIG. 7 is depicted, according to aspects described herein. From this cross-sectional view, it can readily be seen that an inner planet hub 190 can be concentrically disposed within the outer planet hub 158 and attached to the planet gear 140 via bolts 192. A first planetary bearing 193 and a second planetary bearing 194 can be disposed between the inner planet hub 190 and outer planet hub 158. The first and second planetary bearings 193, 194 are configured to enable the inner planet hub 190 to rotate about the planetary axis 118 while the outer planet hub 158 remains stationary relative to the planetary axis 118. The lunar orbiter plate 148 can be rigidly attached to a lower flange 196 the inner planet hub 190 to enable the lunar orbiter plate 148 to rotate about the planetary axis 118 with the rotation of the planet gear 140.

The lunar rotation system 124 also includes a plurality of inner lunar hubs 198. One of each respective inner lunar hub 198 has one of each respective lunar axis 120 extend centrally therethrough. One of each respective outer lunar hub 186 can be mounted concentrically over one of each respective inner lunar hub 198. Each respective outer lunar hub 186 can be fixedly attached to the lunar orbiter plate 148 via bolts 188. Each respective outer lunar hub 186 can be configured to be positioned stationarily relative to the lunar axis 120. A first lunar bearing 199 and a second lunar bearing 200 can be disposed between each respective inner lunar hub 198 and outer lunar hub 186. The first and second lunar bearings 199, 200 are configured to enable the inner lunar hub 198 to rotate about the lunar axis 120, while the outer lunar hub 186 remains stationary relative to the lunar axis 120. One of each respective lunar substrate holder 112 can be rigidly attached to one of each respective inner lunar hub 198 at a lower flange 202 of the inner lunar hub 198. The rigidly attaching the lunar substrate holders 112 to the inner lunar hub 198 enables the lunar substrate holders 112 to rotate about each of their associated lunar axes 120.

Figure 9A:
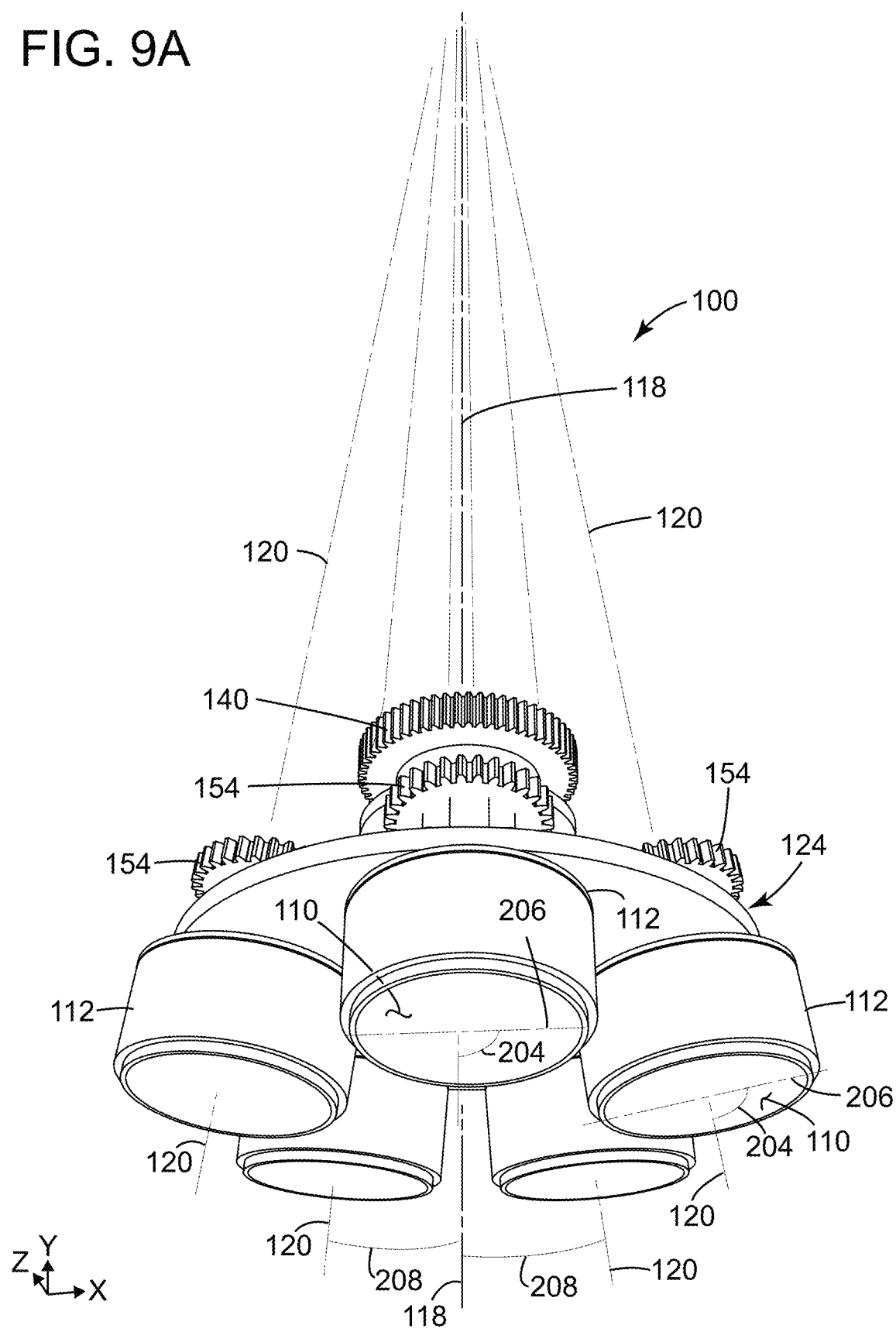
FIG. 9A depicts a perspective side view of the lunar rotation system 124 of FIG. 8, having each respective lunar axis tilted outward at an acute angle relative to the planetary axis, according to aspects described herein.

Referring to FIG. 9A, an example is depicted of a perspective view of the lunar rotation system 124 of FIG. 8, having each respective lunar axis tilted outward at an acute angle 208 relative to the planetary axis 118, according to aspects described herein. In the example of FIG. 9A, the respective lunar optical holders 112 may be configured to hold their associated substrate 110 substantially in a plane oriented at a perpendicular angle 204 relative to their associated lunar axis 120. This is illustrated by the right angles 204 formed by the lunar optical holders' 112 associated lunar axis 120 and the lines of incline 206 of the respective substrates 110.

Additionally in the example of FIG. 9A, all of the respective lunar axes 120 are tilted outward at an acute angle 208 relative to the to the planetary axis 118 passing centrally through the lunar rotation system 124. This is illustrated by the acute angles 208 formed by the lunar axes 120 and the planetary axis 118 of the lunar rotation system 124.

Tilting all the lunar axes 120 outwardly at the same acute angle 208 relative to the planetary axis 118 assures that the deposition pattern formed on each respective substrate 110 of the lunar rotation system 124 will be substantially identical. In other words, as the substrates 110 pass by the lunar mask opening 168 (see FIG. 3B) of the respective lunar optical holders 112, those substrates 110 will be exposed to the evaporating material 114 (see FIG. 1) at the same angle and for the same amount of time to form substantially the same deposition pattern on the substrates 110.

The tilting may also be adjustable. This is advantageous because it adds another adjustment variable to the planetary rotation system 100 to provide optimal placement of the substrates 110 relative to the source material being evaporated, especially for curved substrates.

By way of example, a substrate 110 may have a spherical shape. If a source of evaporating material 108 is positioned to optimally coat the center of the substrate, then the source 108 may not be coating the edges optimally because the edges are curving away from the center. The source 108 may be repositioned to more optimally coat the entire substrate, but moving a source is difficult. It involves readjustment of water and power lines and other difficult to move control devices. Whereas, changing the angle of tilt of the lunar axis 120 relative to the planetary axis 118 may be accomplished more easily and have the same effect.

Referring to FIG. 9B, an example is depicted of a perspective side view of the lunar rotation system 124 of FIG. 8, having each respective lunar axis 120 tilted inward at an acute angle 210 relative to the planetary axis 118, according to aspects described herein. In the example of FIG. 9B, the respective lunar optical holders 112 may be configured to hold their associated substrate 110 substantially in a plane oriented at a perpendicular angle 204 relative to their associated lunar axis 120. This is illustrated by the right angles 204 formed by the lunar optical holders' 112 associated lunar axis 120 and the lines of incline 206 of the respective substrates 110.

Additionally in the example of FIG. 9B, all of the respective lunar axes 120 are tilted inward at an acute angle 210 relative to the to the planetary axis 118 passing centrally through the lunar rotation system 124. This is illustrated by the acute angles 210 formed by the lunar axes 120 and the planetary axis 118 of the lunar rotation system 124.

Tilting all the lunar axes 120 inwardly at the same acute angle 208 relative to the planetary axis 118 assures that the deposition pattern formed on each respective substrate 110 of the lunar rotation system 124 will be substantially identical. In other words, as the substrates 110 pass by the lunar mask opening 168 (see FIG. 3B) of the respective lunar optical holders 112, those substrates 110 will be exposed to the evaporating material 114 (see FIG. 1) at the same angle and for the same amount of time to form substantially the same deposition pattern on the substrates 110.

Though FIGS. 9A and 9B illustrate the acute angles of tilt 208 and 210 formed between the respective lunar axes 120 and the planetary axis 118 as being the same, the angles 208, 210 may also be different for different lunar optical holders 112 within a specific lunar rotation system 124. However, in that case, the deposition patterns may not be the same from substrate to substrate within the lunar rotation system 124.

Referring to FIG. 10, a top perspective view of another embodiment of a planetary rotation system 300, wherein each respective lunar rotation system 124 can be driven by an independent planetary drive motor 302, according to aspects described herein. The planetary rotation system 300 can be substantially the same as the planetary rotation system 100 except that the planet gears 140 have been replaced by independently controlled planetary drive motors 302 and the stationary solar gear 134 has been eliminated. Therefore, the reference numbers remain the same for the same or substantially similar features and will not be discussed in any further detail.

The planetary rotation system 300 incudes a plurality of planetary drive motors 302 mounted to the solar orbiter plate 138. One of each respective planetary drive motor 302 can be attached to one of each respective lunar rotation system 124 and has one of each respective planetary axis 118 extend centrally therethrough. Each respective planetary drive motor 302 can be operable to independently rotate the lunar orbiter plate 148 (see FIG. 2B) of its attached lunar rotation system 124 about its associated planetary axis 118.

Advantageously, the planetary drive motors 302 of planetary rotation system 300 can rotate the lunar orbiter plates 148 independently of the gear ratio between a solar gear 134 and a planet gear, as in planetary rotation system 100. This allows an additional control variable, i.e., speed of rotation of the substrates 110 around the planetary axis 118, that can enable more precise control of the coating profiles on the substrates or a wider variety of coating profiles on the substrates 110.

The examples of planetary rotations systems 100, 300 illustrated herein are shown using gears to drive the rotational devices, such as, for example, the solar orbiter plate 138, lunar orbiter plate 148 and lunar substrate holders 112. However, other types of drive systems may be used to drive such rotational devices. For example, friction wheels, belt drives and chain/sprocket systems may also be used.

Advantageously, use of such planetary rotations systems having lunar rotation subsystems in accordance with aspects described herein, such as planetary rotation systems 100, 300 and lunar rotation system 124, enables, for example, uniform coatings over curved surfaces and/or nonuniform coatings over flat surfaces (radially graded surfaces).

Also advantageously, use of such planetary rotations systems having lunar rotation subsystems in accordance with aspects described herein, such as planetary rotation systems 100, 300 and lunar rotation system 124, enables precise control of nonuniform coatings in a variety of types of applications.

For purposes herein, the following terms shall mean as follows: radially nonuniform coating: means that along any given radius of a substrate, from center to edge of the substrate, the thickness of a coating will vary, in accordance with an intended design thickness profile.

axially symmetric coating: means that along any given circumference of a substrate, from a circumference having a radius of substantially 0 percent of the entire center to edge radius of the substrate to 100 percent of the entire center to edge radius of the substrate and any radius in between, the thickness of a coating along that circumference will be substantially constant within reasonable tolerance levels (e.g., +0.02%, +0.05%, +0.10%, +0.50%, etc.).

One useful category of nonuniform coatings are radially nonuniform, axially symmetric coatings. That is, the coating thickness will vary along any given radius, per an intended design profile, but will be substantially constant along any given circumference of the substrate.

Advantageously, planetary rotation systems having lunar rotation subsystems and methods of use in accordance with aspects described herein (such as planetary rotation systems 100, 300 and lunar rotation system 124), enables a more precise adjustment of thickness of a coating on a substrate as a function of the radius of the substrate. One such reason for this more precise adjustment capability is that the center of the substrate 110 in a lunar rotation system 124 is not stationary with respect to the mask opening 168 (see FIG. 3B), so that the coating thickness at the center of the substrate 110 is not limited to 0 percent or 100 percent of the maximum thickness of the coating. Another reason for this more precise capability is that the mask 122 and mask opening 168 may be more precisely placed relative to the substrates 110 than in planetary rotations systems that do not have a lunar rotation system 124 included.

Radially nonuniform, axially symmetric coatings have many commercial applications. Some examples and/or applications of radially nonuniform, axially symmetric coatings include stress-compensation coatings, asphere generation coatings and radial group-delay compensation coatings: A more detailed description of each particular example of a radially nonuniform, axially symmetric coating follows.

Stress-Compensation Coatings

Such stress-compensation coatings may be used to provide a layer profile corresponding approximately to a cubic thickness dependence as a function of the substrate radius. Such stress-compensation coatings can be used as a front-side coating to pre-figure a substrate in order to compensate for stress-induced deformation of an additional, compressively stressed coating. The desired profile of the stress-compensation coating may be determined by finite-element analysis (FEA), based on the substrate thickness and anticipated multilayer coating to be deposited.

Such stress-compensation coatings often start with a coating thickness close to zero at the center and then increase outwardly along the radius of the substrate. In some stress-compensation coatings, the thickness of the coating varies approximately as a function of the radial distance from the center cubed. However, the coating remains axially symmetric.

The lunar mask opening geometry is designed using FEA to provide the desired profile of the coating. Often though, since the center of the substrate 110 may have substantially zero coating, the lunar mask opening 168 is designed in shape and position such that the center of the substrate in a lunar rotation system 124 does not pass over the lunar opening 168.

Asphere Generation Coatings

The performance of many lenses improves significantly with a slight departure from a perfect spherical surface (i.e., aspheric lenses). However, equipment to fabricate aspheric lenses tends to be quite expensive and complex. Nonuniform profiles for coating can be used, particularly with an index-matching material (for example, silicon dioxide on a fused silica lens), to create a nonuniform radial thickness profile to modify an inexpensive spherical lens surface into a high-performance aspheric profile.

Asphere, as used herein, means any shape that is a deviation from a spherical shape, e.g., parabolic or hyperbolic. There are many commercial applications for aspheric substrates, but making substrates with an aspheric surface profile (as opposed to a spherical profile) is expensive. However, use of such planetary rotation systems 100, 300 which include such lunar rotations systems 124, provide a tool that can easily alter the surface profile of a spherical substrate to the desired aspheric shape required for the application. Again, the coating would be a function of the mask design and would be radially nonuniform and axially symmetric.

Radial Group-Delay Compensation Coatings

A challenge for ultrafast optical systems (femtosecond scale lasers) is that components such as lenses induce a spatially dependent group delay, leading to spatial variations in the laser pulse temporal profile and corresponding intensity. An optical interference coating can be designed with spatial variations in one or more layers, such that the group delay and group delay dispersion can also be modified. Since aspects of the planetary rotation systems with lunar rotation subsystems described herein may be used to realize radial control of optical coating thickness, such planetary rotation systems may be utilized advantageously in methods to achieve such a spatially dependent control of group delay. This can be done, for example, for individual layer(s) within a multilayer coating, not limited to the first or last layer.

Radial group-delay compensation coatings are used to compensate for the phenomenon of group delay in applications using ultra short laser pulses. For example, laser pulses in the femtosecond or attosecond ranges, wherein, for example, one is measuring the changing distance between two vehicles on the highway with laser pulses.

Group-delay of short laser pulses (e.g., 15 femtosecond laser pulse is about 5 microns long) is caused by several factors. For example, a laser pulse hitting a lens that is thicker in the center and thinner at the edges will take more time to travel through the center. However, after leaving the lens the pulse is focused down to a point, so the light from the edges of the lens must travel further than the light from the center. Moreover, the ultra-short laser pulses tend to have very broad spectral content (i.e., different wavelengths or colors). These different wavelengths can also be delayed differently as they pass through a lens. All of these factors can cause certain portions of the laser pulses to be delayed and arrive at their target at different times. This delay of the various components of the laser pulses is known collectively as group-delay.

However, use of such planetary rotation systems 100, 300 which include such lunar rotations systems 124, provide a tool that can alter the surface profile of a substrate used with ultra-short laser pulses to compensate for such group delay phenomenon. Again, the coating would be a function of the mask design and would often be radially nonuniform and axially symmetric.

Figure 11:
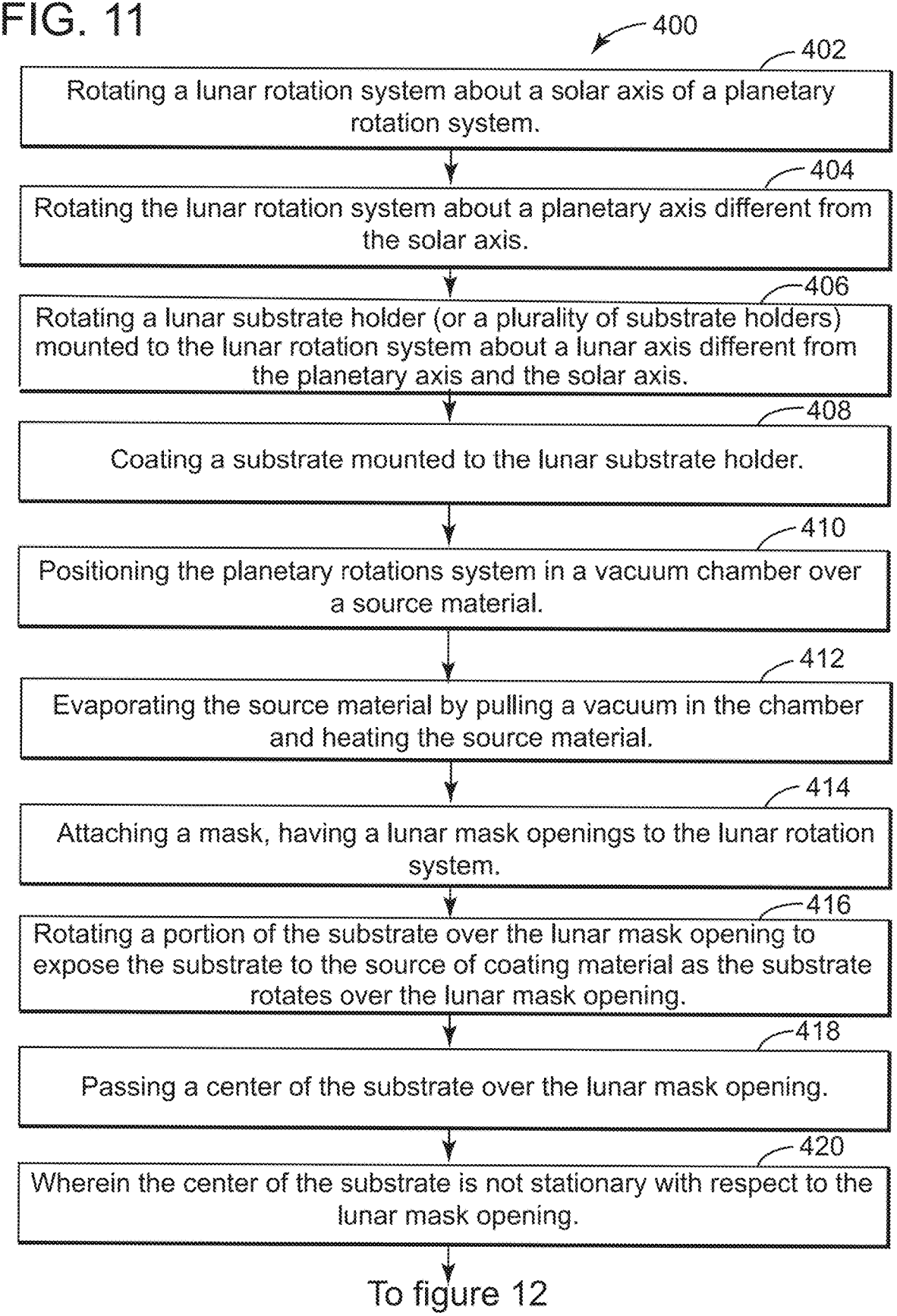
FIG. 11 depicts a flow diagram of a method of coating a substrate, according to aspects described herein.

Referring to FIG. 11, a flow diagram of an example of a method 400 of coating a substrate is depicted, according to aspects described herein. The following are examples of various methods of coating a substrate in accordance with aspects described herein.

The method 400 begins at 402 by rotating a lunar rotation system 124 about a solar axis 116 of a planetary rotation system 100. The planetary rotation system 100 may include a solar orbiter plate 138 configured to rotate about the solar axis 116. The lunar rotation system 124 may be rotationally mounted to the solar orbiter plate 138.

At 404, the lunar rotation system 124 rotates about a planetary axis 118 different from the solar axis 116. The lunar rotation system 124 may be affixed to a planet gear 140 that is attached to the solar orbiter plate 138. The planet gear 140 may rotate around the planetary axis 118 as the solar orbiter plate 138 orbits around the solar axis 120. The planet gear 140 may, therefore, drive the lunar rotation system 124 around planetary axis 118.

At step 406, a lunar substrate holder 112 mounted to the lunar rotation system 124 is rotated about a lunar axis 120 that is different from the planetary axis 118 and the solar axis 116. The lunar rotation system 124 may include a lunar orbiter plate 148. One or more lunar substrate holders 112 may be mounted on the lunar orbiter plate 148. The respective lunar substrate holders 112 may include a lunar axis 120 extending centrally therethrough. The respective lunar axes 120 may be configured to rotate about the planetary axis 116.

At step 408, a substrate mounted to the one or more lunar substrate holders is coated. The respective lunar substrate holders 112 may be configured to rotate about their respective lunar axis 120 and to hold a substrate 110 for coating.

At 410 of the method 400, the planetary rotation system 100 is positioned in a vacuum chamber 102 over a source of coating material 108. The planetary rotation system 100 may have a mounting plate 104 configured to rigidly attach the planetary rotation system to an upper portion of the vacuum chamber 102. The source material 108 may be disposed in an evaporating boat 106 directly under the planetary rotation system 100.

At 412, the source material 108 is evaporated 114 by pulling a vacuum in the vacuum chamber 102 and heating the source material 108. The source material 108 would then discharge evaporating material 114, which would coat anything within a straight line of sight of the source material 108.

At 414 of the method, a lunar mask 122, having a lunar mask opening 168, is attached to one or more lunar rotation systems 124. To do this, a lunar mask plate 144 may be fixedly attached to the solar orbiter plate 138. For example, the lunar mask plate 144 may be mounted directly to a bottom surface of the solar orbiter plate 138. A lunar mask wall 146 may be fixedly attached to, and extend downward from, the lunar mask plate 144. The lunar mask wall 146 may surround the one or more lunar substrate holders 112. The lunar mask 122 may be fixedly attached to a bottom portion of the lunar mask wall 146, wherein the lunar mask 122 has the lunar mask opening 168 disposed therethrough.

At 416, a portion of the respective substrates 110, held by the respective lunar substrate holders 112, are rotated over the lunar mask opening 168 to expose the respective lunar substrates 110 to a source of coating material 114 (see FIG. 1) as the lunar substrates 110 rotate over the lunar mask opening 168.

At 418, the centers of the respective lunar substrates 110 pass over the lunar mask opening 168. Additionally, at 420, the centers of the respective lunar substrates 110 are not fixed relative to the lunar mask opening 168 (see FIG. 3B).

It is advantageous that lunar rotation system 124 provides a third axis 120, which enables the centers of the substrates 110 in the lunar rotation system 124 to be configured such that the centers are not stationary with respect to the lunar mask opening 168 (see FIG. 3B). Accordingly, the substrates 110 may be accurately masked such that the deposition of vaporized materials 114 on their centers may not be limited to 0 percent or 100 percent of the maximum thickness of the vaporized materials deposited on the lunar substrate 110. Rather, the percentage of maximum thickness of vaporized materials at the center of the substrates 110 may be 0 percent, 100 percent, or any percentage in between, such as, for example, 20 percent, 40 percent 50 percent, 75 percent or any other percentage between 0 and 100 percent. The ability to coat the center of the substrate 110 to a thickness between 0 and 100 percent of the maximum thickness of the vaporized materials is advantageous, because many substrates 110 (including their centers) have to be coated at a percentage of maximum thickness other than 0 or 100 percent for optimal performance.

By contrast, in previous two-axis planetary rotation systems, the substrates would orbit a solar axis and would also rotate about a planetary axis, much like a planet spins on its axis as the planet orbits the sun. A mask, having a mask opening, may be mounted under the substrate, directly to the planetary rotation system similarly to the way the lunar mask 122 is mounted to the lunar rotation system 124 in the three-axis planetary rotation system 100 of the present disclosure. However, in this configuration the planetary axis would pass through the centers of both the substrate and the mask of the two-axis system. Accordingly, the center of the substrate would be stationary with respect to the center of the mask and mask opening. As such the substrate center would be limited to only being coated a 0 percent of the maximum coating thickness when the mask opening does not expose the center, or 100 percent of the maximum coating thickness when the mask opening exposes the center for the entire deposition process.

Also, by way of contrast, it is possible to mount a mask, having a mask opening, to the walls of the vacuum chamber 102 in which a two-axis planetary rotation system is placed. In this configuration, the center of the substrate would not be stationary relative to the mask. However, the factors that contribute to unwanted tolerances for positioning the mask relative to the moving substrates would disadvantageously grow, which would negatively affect the tolerances of the desired coating profiles on the substrates. Such factors would include, for example, the tolerances of positioning the mask to the walls of the vacuum chamber, plus the tolerances for positioning the planetary rotation system to the walls of the vacuum chamber, both of which would be eliminated if the mask were mounted directly to the planetary rotation system.

Accordingly, in a two-axis system, mounting the mask to the walls of the vacuum chamber may enable the centers of the substrates to move relative to the mask. However, such a configuration would come at the sacrifice of the precision with which the coating profiles can be deposited onto the substrate.

At 422, the exemplary method 400 continues, wherein the lunar axes 120 may be tilted outwardly or inwardly at an acute angle relative to the planetary axis 118 (see FIGS. 9A and 9B). Tilting all the lunar axes 120 outwardly at the same acute angle 208 relative to the planetary axis 118 assures that the deposition pattern formed on each respective substrate 110 of the lunar rotation system 124 will be substantially identical. In other words, as the substrates 110 pass by the lunar mask opening 168 (see FIG. 3B) of the respective lunar optical holders 112, those substrates 110 will be exposed to the evaporating material 114 (see FIG. 1) at the same angle and for the same amount of time to form substantially the same deposition pattern on the substrates 110.

The tilting may also be adjustable. This is advantageous because it adds another adjustment variable to the planetary rotation system 100 to provide optimal placement of the substrates 110 relative to the source material 108 being evaporated, especially for curved substrates.

By way of example, a substrate 110 may have a spherical shape. If a source of evaporating material 108 is positioned to optimally coat the center of the substrate, then the source 108 may not be coating the edges optimally because the edges are curving away from the center. The source 108 may be repositioned to more optimally coat the entire substrate, but moving a source is difficult. It involves readjustment of water and power lines and other difficult to move control devices. Whereas, changing the angle of tilt of the lunar axis 120 relative to the planetary axis 118 may be accomplished more easily and have the same effect.

At 424, the substrate 110 is coated with a radially nonuniform and axially symmetric coating. More specifically, the substrate 110 is coated such that along any given radius of the substrate, from center to edge of the substrate, the thickness of a coating will vary in accordance with a desired coating profile. However, along any given circumference of the substrate 110, the thickness of the coating along that circumference will be substantially constant within reasonable tolerance levels.

The planetary rotation system 100 with its included lunar rotation system 124 provides additional features and tools over previous two-axis planetary rotation systems to more precisely create the desired radially nonuniform and axially symmetric coating profiles of any given application. Examples of such features include, the additional third lunar axis 120, the ability of the center of the substrate 110 to move relative to its associated lunar mask 122 and lunar mask opening 168, as well as the additional precision with which the mask 122 can be positioned relative to the moving substrate 110.

At 426, the radially nonuniform, axially symmetric coating is a stress-compensation coating. In other words, the coating may be used in a multilayer application as a front side coating to pre-figure a substrate in order to compensate for stress-induced deformation of an additional, compressively stressed coating as described earlier herein.

The desired profile of the stress-compensation coating may be determined by finite-element analysis (FEA) of the lunar mask's 122 configuration and positioning relative to the substrate 110. The desired profile of the stress-compensation coating may also be based on the substrate thickness and anticipated multilayer coating to be deposited.

At 428, the radially nonuniform, axially symmetric coating is an asphere generation coating. In other words, the coating may be used in an application to alter the surface profile of a spherical substrate (such as a lens) to a desired aspheric shape, in order to significantly improve the performance of the substrate 110 as described earlier herein. The desired profile of the asphere generation coating may be determined, based on the departure of the desired aspheric profile from a starting spherical profile, to design the lunar mask's 122 configuration and positioning relative to the substrate 110.

At 430 of method 400, the radially nonuniform, axially symmetric coating is a radial group-delay compensation coating. In other words, the coating may be used in an application using ultra short laser pulses, to compensate for the phenomenon of group-delay as described earlier herein.

The desired profile of the radial group-delay compensation coating may be determined by optical interference coating design, considering the reflected phase and derivatives thereof of the optical coating, to determine the nonuniform radial thickness profile of one or more coating layers and the corresponding lunar masks' 122 configuration and positioning relative to the substrate 110.

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it have the full scope defined by the language of the following claims.

What is claimed is:

1. A planetary rotation system for coating, the planetary rotation system comprising:
   a solar orbiter plate configured to rotate about a solar axis;
   a lunar rotation system mounted to the solar orbiter plate, the lunar rotation system comprising:
      a lunar orbiter plate configured to rotate about a planetary axis, and
      a plurality of lunar substrate holders mounted on the lunar orbiter plate, wherein respective ones of the lunar substrate holders are configured to hold a substrate for coating and are further configured to rotate about a lunar axis, wherein the respective ones of the lunar substrate holders are further configured to orbit about the planetary axis.

2. The planetary rotation system of claim 1, comprising:
   a solar gear having solar gear teeth and the solar axis extending centrally therethrough, the solar gear configured to be positioned stationarily relative to the solar axis;
   a planet gear having planet gear teeth and the planetary axis extending centrally therethrough, the planet gear mounted to the solar orbiter plate such that the planet gear teeth mesh with the solar gear teeth to rotate the planet gear about the planetary axis; and
   the lunar rotation system being attached to the planet gear such that the rotation of the planet gear rotates the lunar orbiter plate about the planetary axis.

3. The planetary rotation system of claim 2, wherein:
   the planet gear comprises a plurality of planet gears mounted to the solar orbiter plate; and
   the lunar rotation system comprises a plurality of lunar rotation systems, wherein respective ones of the lunar rotation systems are mounted to respective ones of the planet gears.

4. The planetary rotation system of claim 1, wherein the lunar rotation system comprises:
   a lunar orbiter gear having lunar orbiter gear teeth, the lunar orbiter gear configured to be positioned stationarily relative to the planetary axis;
   a plurality of lunar gears having lunar gear teeth, wherein respective ones of the lunar gears are attached to respective ones of the lunar substrate holders and have respective ones of the lunar axes extending centrally therethrough, wherein the plurality of lunar gears are mounted to the lunar orbiter plate such that the lunar gear teeth of the plurality of lunar gears mesh with the lunar orbiter gear teeth to rotate the respective ones of the lunar gears about their associated lunar axis.

5. The planetary rotation system of claim 1, wherein the lunar rotation system comprises:
   a lunar mask plate fixedly attached to the solar orbiter plate;
   a lunar mask wall fixedly attached to, and extending downward from, the lunar mask plate, the lunar mask wall surrounding the plurality of lunar substrate holders;
   a lunar mask fixedly attached to a bottom portion of the lunar mask wall, the lunar mask having a lunar mask opening disposed therethrough; and
   wherein at least a portion of the substrates held by the respective ones of the lunar substrate holders are configured to pass over the lunar mask opening as the respective ones of the lunar substrate holders orbit about the planetary axis.

6. The planetary rotation system of claim 5, wherein centers of the substrates held by the respective ones of the lunar substrate holders are not stationary with respect to the lunar mask opening.

7. The planetary rotation system of claim 5, wherein centers of the substrates held by the respective ones of the lunar substrate holders pass over the lunar mask opening.

8. The planetary rotation system of claim 1, wherein the respective ones of the lunar axes about which the respective ones of the lunar substrate holders rotate are tilted inward at an acute angle relative to the planetary axis.

9. The planetary rotation system of claim 1, wherein the respective ones of the lunar axes about which the respective ones of the lunar substrate holders rotate are tilted outward at an acute angle relative to the planetary axis.

10. The planetary rotation system of claim 1, comprising:
    an inner center hub configured to be positioned stationarily relative to the solar axis;
    an outer center hub concentrically disposed over the inner center hub; and
    a first solar bearing and a second solar bearing disposed between the inner center hub and outer center hub, the first and second solar bearings configured to enable the outer center hub to rotate about the solar axis;
    wherein the solar orbiter plate is attached to the outer center hub to enable the solar orbiter plate to rotate about the solar axis.

11. The planetary rotation system of claim 1, wherein the lunar rotation system comprises:
    an outer planet hub fixedly attached to the solar orbiter plate, the outer planet hub configured to be positioned stationarily relative to the planetary axis;
    an inner planet hub concentrically disposed within the outer planet hub;
    a first planetary bearing and a second planetary bearing disposed between the inner planet hub and outer planet hub, the first and second planetary bearings configured to enable the inner planet hub to rotate about the planetary axis;
    wherein the lunar orbiter plate is attached to the inner planet hub to enable the lunar orbiter plate to rotate about the planetary axis.

12. The planetary rotation system of claim 1, wherein the lunar rotation system comprises:
    a plurality of inner lunar hubs, wherein respective ones of the inner lunar hubs have respective ones of the lunar axes extend centrally therethrough;

a plurality of outer lunar hubs, wherein respective ones of the outer lunar hubs are mounted concentrically over the respective ones of the inner lunar hubs, wherein the respective ones of the outer lunar hubs are fixedly attached to the lunar orbiter plate, wherein the respective ones of the outer lunar hubs are configured to be positioned stationarily relative to their associated lunar axis;

a first lunar bearing and a second lunar bearing disposed between the respective ones of the inner lunar hubs and the respective ones of the outer lunar hubs, wherein the first and second lunar bearings are configured to enable the respective ones of the inner lunar hubs to rotate about their associated lunar axis;

wherein the respective ones of the lunar substrate holders are attached to the respective ones of the inner lunar hubs to enable the respective ones of the lunar substrate holders to rotate about their associated lunar axis.

13. The planetary rotation system of claim 1, comprising:
a planetary drive motor mounted to the lunar rotation system and having the planetary axis extend centrally therethrough, wherein the planetary drive motor is operable to independently rotate the lunar orbiter plate of the attached lunar rotation system about the planetary axis.

14. A planetary rotation system for coating, the planetary rotation system comprising:
a solar axis about which the planetary rotation system is configured to rotate; and
a lunar rotation system configured to rotate about a planetary axis passing centrally therethrough and further configured to orbit about the solar axis, wherein the planetary axis is different from the solar axis, the lunar rotation system comprising:
a lunar substrate holder configured to hold a substrate for coating, the substrate having a center that is offset from the solar axis and the planetary axis.

15. The planetary rotation system of claim 14, wherein the lunar substrate holder is configured to rotate about a lunar axis extending centrally therethrough, wherein the lunar axis is different from the solar axis and the planetary axis.

16. The planetary rotation system of claim 15, wherein:
the lunar substrate holder comprises a plurality of lunar substrate holders; and
the lunar axis comprises a plurality of lunar axes.

17. A method of coating a substrate, comprising:
rotating a lunar rotation system about a solar axis of a planetary rotation system;
rotating the lunar rotation system about a planetary axis different from the solar axis;
rotating a lunar substrate holder mounted to the lunar rotation system about a lunar axis different from the planetary axis and the solar axis; and
coating the substrate mounted to the lunar substrate holder.

18. The method of claim 17, comprising:
attaching a lunar mask, having a lunar mask opening, to the lunar rotation system;
rotating a portion of the substrate over the lunar mask opening to expose the substrate to a source of coating material as the substrate rotates over the lunar mask opening.

19. The method of claim 18, wherein a center of the substrate is not stationary with respect to the lunar mask opening.

20. The method of claim 18, wherein a center of the substrate passes over the lunar mask opening.

* * * * *